United States Patent
Hajjar

(10) Patent No.: US 9,291,887 B2
(45) Date of Patent: Mar. 22, 2016

(54) ROLLABLE DISPLAY SCREEN QUILT

(71) Applicant: PRYSM, Inc., San Jose, CA (US)

(72) Inventor: Roger A. Hajjar, San Jose, CA (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 14/640,460

(22) Filed: Mar. 6, 2015

(65) Prior Publication Data

US 2015/0253657 A1     Sep. 10, 2015

Related U.S. Application Data

(60) Provisional application No. 61/949,119, filed on Mar. 6, 2014.

(51) Int. Cl.
*G03B 21/58* (2014.01)
*G03B 21/56* (2006.01)
*G03B 21/62* (2014.01)

(52) U.S. Cl.
CPC .............. *G03B 21/58* (2013.01); *G03B 21/567* (2013.01); *G03B 21/62* (2013.01)

(58) Field of Classification Search
CPC ....... G03B 21/58; G03B 21/567; G03B 21/62
See application file for complete search history.

(56) References Cited

U.S. PATENT DOCUMENTS

| 4,439,027 | A | 3/1984 | Shioda et al. | |
|---|---|---|---|---|
| 4,773,731 | A | 9/1988 | Goldenberg et al. | |
| 5,337,179 | A | 8/1994 | Hodges | |
| 6,873,460 | B1 | 3/2005 | Burstyn et al. | |
| 8,284,487 | B1 * | 10/2012 | Liu | 359/449 |
| 8,830,577 | B2 | 9/2014 | Hajjar | |
| 2002/0024495 | A1 | 2/2002 | Lippert et al. | |
| 2004/0001254 | A1 | 1/2004 | Shimizu | |
| 2004/0257652 | A1 | 12/2004 | Peterson et al. | |
| 2007/0228927 | A1 | 10/2007 | Kindler et al. | |
| 2011/0157695 | A1 * | 6/2011 | Katsenelenson et al. | 359/449 |

* cited by examiner

*Primary Examiner* — Christ Mahoney
(74) *Attorney, Agent, or Firm* — Patterson & Sheridan, LLP

(57) ABSTRACT

A rollable display screen for use in electronic display systems includes a rollable screen that is mechanically coupled to a roller mechanism and has a plurality of pixel elements disposed thereon. The roller mechanism is configured as a stowing mechanism for the rollable screen, and may be further configured to deploy the rollable screen as a substantially planar viewing surface. The rollable display screen can be advantageously used for a durable and easily transported electronic display device since the rollable display screen is light-weight, durable, and compact.

17 Claims, 19 Drawing Sheets

ROLLABLE DISPLAY SCREEN QUILT

CROSS-REFERENCE TO RELATED APPLICATION

The present application claims priority to U.S. Provisional Patent Application Ser. No. 61/949,119, filed on Mar. 6, 2014, which is incorporated herein by reference in its entirety. The present application is related to U.S. patent application Ser. No. 13/470,051, filed on May 11, 2012 and issued as U.S. Pat. No. 8,830,577 on Sep. 9, 2014, and to U.S. Provisional Patent Application Ser. No. 61/485,520, filed on May 12, 2011, each of which is incorporated herein by reference in its entirety.

BACKGROUND OF THE DISCLOSURE

1. Field of the Disclosure

Embodiments of the present disclosure relate generally to display devices and, more specifically, to a rollable display screen for a display device.

2. Description of the Related Art

Electronic display systems are commonly used to display information from computers and other sources. Typical display systems range in size from small displays used in mobile devices to very large displays, such as tiled displays, that are used to display images to thousands of viewers at one time. Display screens for such display systems are typically bulky and fragile, and are consequently difficult to transport. Accordingly, there is a need in the art for a lightweight and portable display screen suitable for use in electronic display systems.

SUMMARY OF THE DISCLOSURE

One embodiment of the present disclosure sets forth a rollable display screen suitable for use in electronic display systems. The rollable display screen includes a rollable screen that is mechanically coupled to a roller mechanism and has a plurality of pixel elements disposed thereon. The roller mechanism is configured as a stowing mechanism for the rollable screen, and may be further configured to deploy the rollable screen as a substantially planar viewing surface. The rollable display screen can be advantageously used for a durable and easily transported electronic display device since the rollable display screen is light-weight, durable, and compact.

In another embodiment, a system comprises at least one enclosure. Each enclosure comprises a light scanning device disposed within the enclosure; and one or more optical detectors disposed within the enclosure. The system further comprises a rollable phosphor display screen at least partially bounding the at least one enclosure, wherein the screen is distinct from and physically separated from the one or more optical detectors and wherein the detector detects the position of light from the light scanning device impacting the screen.

In another embodiment, an apparatus comprises a composite phosphor-filter layer comprising: stripes of phosphor where a plurality of parallel fluorescent stripes are formed, wherein adjacent fluorescent stripes are made of different fluorescent materials that absorb light at an excitation wavelength to emit light of different colors, respectively, where the fluorescent stripes include a low-index refraction that is disposed in the region between any separation between phosphor regions; a first layer sheet, where the first layer sheet includes a coextruded filter layer, where the coextruded filter layer reflects white light and passes an excitation light, where the coextruded filter layer side which has the excitation light passed through is affixed to the stripes of phosphor; a second layer sheet, where the second layer sheet includes a coextruded filter layer, where the coextruded filter layer reflects white light and passes an excitation light, where the coextruded filter layer side which has the excitation light passed through is affixed to the stripes of phosphor; the first layer sheet and the second layer sheet are disposed next to one another such that the screens abut one another to collectively form a single composite phosphor-filter layer, where the spacing between adjacent phosphor stripes is of a particular pitch, where the first layer sheet and the second layer sheet are coupled together by a coupling mechanism; the composite phosphor-filter layer is rolled.

In another embodiment, an apparatus comprises one or more light engines, wherein each light engine includes one or more light sources for emitting a light towards a screen; and a rollable screen, wherein the rollable screen includes: a plurality of layer sheets disposed adjacent each other; and a composite filter layer coupled to the plurality of sheets, wherein the composite filter layer includes: phosphor regions, wherein each phosphor region includes stripes of phosphor, wherein the stripes of phosphor are a plurality of parallel fluorescent stripes, wherein adjacent fluorescent stripes are made of different fluorescent materials that absorb light at an excitation wavelength to emit light of different colors, respectively; and a low-index refraction material that is disposed in the region between any separation between phosphor regions.

In another embodiment, an apparatus comprises a rollable screen, wherein the rollable screen includes: a first layer sheet having a first composite filter layer disposed thereon, wherein the first composite filter layer includes a plurality of first phosphor regions with a first low-index refraction material disposed in the region between any separation between first phosphor regions; and a second layer sheet having a second composite filter layer disposed thereon, wherein the second composite filter layer includes a plurality of second phosphor regions with a second low-index refraction material disposed in the region between any separation between second phosphor regions, wherein the first layer sheet and the second layer sheet are disposed adjacent one another to collectively form a master layer sheet, and wherein the first composite filter layer and the second composite filter layer are disposed adjacent one another to collectively form a master composite filter layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
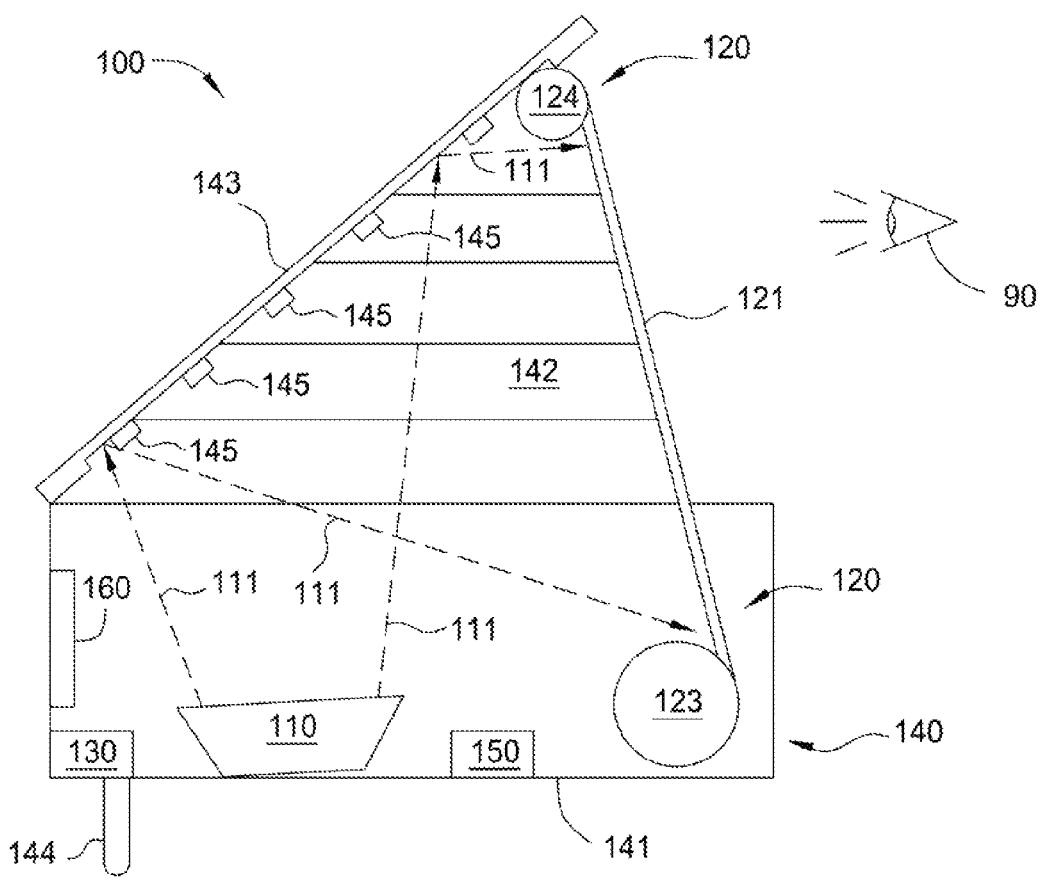
FIG. 1 is a schematic side view of a portable display device, according to an embodiment of the disclosure.

FIG. 1 is a schematic side view of a portable display device 100, according to an embodiment of the disclosure. Portable display device 100 is a compact, light-weight, self-powered apparatus configured to display near-viewing-resolution still and video images that are viewable in a brightly lit outdoor environment. Because portable display device 100 can operate for extended periods without an external power source, portable display device 100 is truly portable, and not simply easily transported. In FIG. 1, portable display device 100 is depicted deployed in a viewing configuration, and includes a light module 110, a retractable screen assembly 120, a self-contained power source 130 (e.g., a battery), a collapsible enclosure assembly 140, a control system 150 and speakers 160. In some embodiments, portable display device 100 includes speakers 160, and in other embodiments, external speakers are used to provide sound.

Light module 110 is configured to generate and direct image-generating beams 111 to produce a high-resolution still or video image on display screen 121 for a viewer 90. Image-generating beams 111 include optical pulses that carry image information. In some embodiments, image-generating beams 111 include visible lasers beams of different colors that discretely illuminate individual pixel elements of screen 121 to produce the image. In other embodiments, image-generating beams 111 include invisible laser beams, such as near-violet or ultra-violet (UV) laser beams that act as excitation beams to excite phosphors on the screen. In such embodiments, image-generating beams 111 are directed to discrete pixel elements of display screen 121 that are made up of light-emitting material that absorbs optical energy from image-generating beams 111 to emit visible light and produce an image. It is also understood that portable display device 100 may be comprised of hybrid visible and invisible lasers. An example could be the use of a blue laser to generate blue color and the same blue laser could be used to excite red and green phosphors. Alternatively, a UV laser may be used to excite green phosphor and a red and blue laser may be used to make red and blue color directly on the screen. In some embodiments, light module 110 is also configured to generate and direct one or more servo laser beams and includes a detector configured to detect servo feedback light produced by the servo laser beam. In such embodiments, the detector generates feedback data for the position of the image-generating beams 111 with respect to display screen 121, so that image-generating beams 111 can be precisely positioned and optical pulses of the image-generating beams 111 precisely timed to produce an error-free high-resolution image. Different embodiments of light module 110 and display screen 121 are described in greater detail below.

Retractable screen assembly 120 includes display screen 121 and is configured to conveniently deploy display screen 121 in a way that does not unduly stress, fatigue, or crease display screen 121. In the embodiment illustrated in FIG. 1, retractable screen assembly 120 includes a roller mechanism that is mechanically coupled to an edge of display screen 121 and is configured to retract and compactly stow display screen 121 when not in use. Roller mechanism prevents any folding or creasing of display screen 121 and ensures that display screen 121 is correctly positioned when deployed to receive image-generating beams 111. Roller mechanism includes a first roller 123 and, in some embodiments, a second roller 124. Roller mechanism can also be used to maintain a desired tension in display screen 121, so that the flexible material of display screen 121 provides a substantially planar viewing surface and therefore a higher quality image for viewer 90. It is noted that the use of roller mechanism is enabled by the fact that display screen 121 can be a flexible, rollable material, as opposed to a more traditional rigid screen. Self-contained power source 130 is configured to provide power to portable display device 100 to generate high-brightness still or video images on display screen 121 for extended periods without the need for an external power source. Self-contained power source 130 may be a lithium-ion battery, a lithium-polymer battery, or any other technically feasible lightweight battery having a relatively high power density. Because the power requirements of light module 110, as described herein, are relatively low with respect to prior art approaches for generating an image, portable display device 100 can operate from self-contained power source 130 for long periods, e.g., on the order of eight or ten hours, even when self-contained power source 130 is a battery weighing as little as three or four pounds.

Collapsible enclosure assembly 140 houses light module 110, retractable screen assembly 120, power source 130, and control system 150, and is configured to optically seal portable display device 100 during use and serve as a compact carrying case when portable display device is stowed for storage or transport. Collapsible enclosure assembly 140 includes a base 141, retractable side shades 142, and a top panel 143. Base 141 makes up the main compartment of collapsible assembly 140 and serves as the base on which portable display device rests when display screen 121 is deployed for viewing. Retractable side shades 142 are configured to optically seal portable display device 100 during use, so that no portion of image-generating beams 111 can leak from collapsible enclosure assembly 140. Retractable side shades 142 may be accordion-style or solid retractable shades, and are configured to be attached to top panel 143 and display screen 121 when display screen 121 is deployed. When display screen 121 is stowed for storage or transport, retractable sides shades are configured to be collapsed into base 141. Top panel 143 is a hinging panel that has an internal mirror for directing image-generating beams 111 from light module 110 to display screen 121 and is configured to support retractable screen assembly 120 when deployed for viewing. In addition, top panel 143 serves as a lid for collapsible enclosure assembly 140 when portable display device is stowed for transport or storage.

Collapsible enclosure assembly 140 has a foldable configuration that extends the optical path between light module 110 and display screen 121 when top panel 143 is opened for use and attached to retractable screen assembly 120, but also makes portable display device 100 compact during transportation. By extending the optical path between light module 110 and display screen 121, the foldable configuration of collapsible enclosure assembly 140 provides an optimum throw distance for the optics directing image-generating beams 111 to display screen 121. This is unlike conventional projection display devices, which may have a foldable encasing to extend the focusing of an image on a display screen. In contrast, the foldable configuration of collapsible enclosure assembly 140, according to embodiments of the disclosure, extends the focus of each of the individual image-generating beams 111, which carry image information, but not the image itself. Thus, the foldable configuration of collapsible enclosure assembly 140 extends the optical path of image-generating beams 111 to an optimum throw distance onto display screen 121, thereby preventing said beams from being either too big, and illuminating more than one pixel elements at one time, or too small, and illuminating only a fraction of a pixel element.

In some embodiments, collapsible enclosure assembly 140 also includes one or more leveling feet 144, which can be deployed to adjust base 141 out of the horizontal plane in order to position display screen 121 substantially perpendicular to the horizontal plane when display screen 121 is deployed. Leveling feet 144 may be of fixed length. Alternatively, leveling feet may be adjustable in height, for fine-tuning of the orientation of display screen 121 and for stabilization of portable display device 100 on uneven surfaces.

In some embodiments, collapsible enclosure assembly 140 includes optical seal detectors 145, which are configured to detect when collapsible enclosure assembly 140 is optically sealed. In one embodiment, one optical seal detector is disposed at each connection point for retractable side shades 142. In another embodiment, fewer optical seal detectors are used. In some embodiments, optical seal detectors 145 include a mechanical switch, while in other embodiments, optical seal detectors 145 include at least one light detector disposed inside collapsible enclosure assembly 140.

Figure 2:
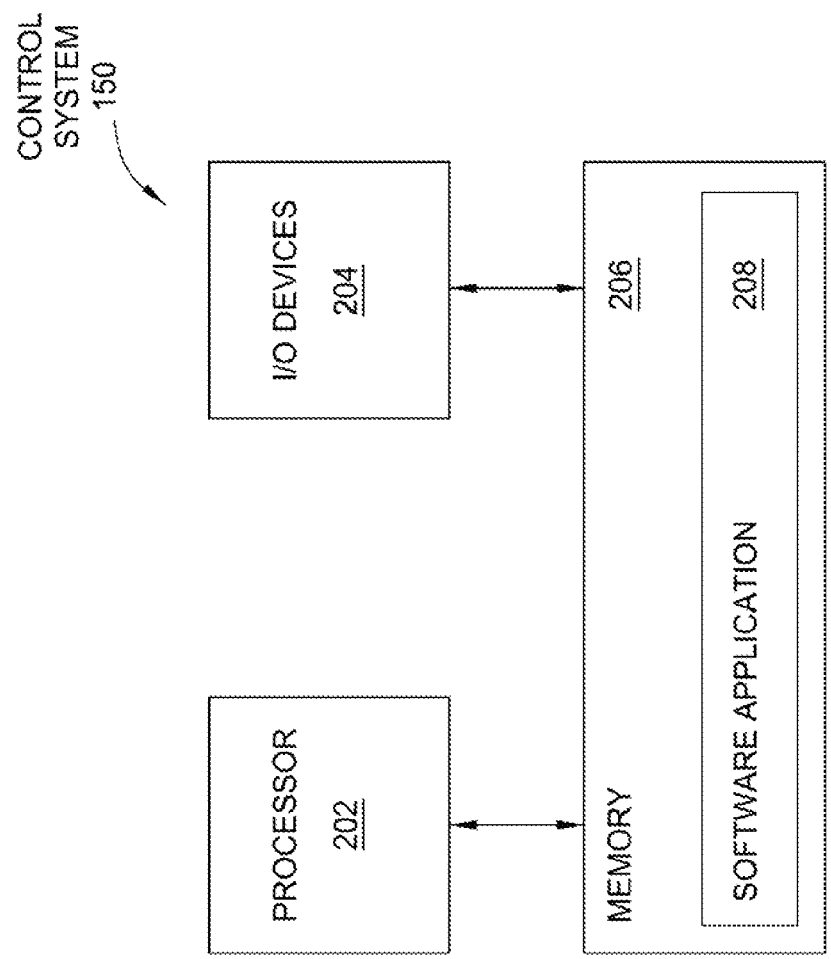
FIG. 2 is a schematic diagram of a control system for the portable display device in FIG. 1, according to some embodiments of the disclosure.

Control system 150 controls operation of the components of light module 110 and other automated components of portable display device 100, and is illustrated in FIG. 2. FIG. 2 is a schematic diagram of control system 150, according to some embodiments of the disclosure. As shown, control system 150 includes a processor 202, one or more input/output (I/O) devices 204, and memory 206. Processor 202 can be any technically feasible type of processor, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications, such as the software application 208. Alternatively, the processor 202 may be a dedicated hardware unit configured to perform specific tasks. I/O device 204 may include any technically feasible devices known in the art including control buttons, an infra-red (IR) receiver, and/or a Bluetooth-enabled transceiver. When I/O device 204 includes a Bluetooth-enabled transceiver, portable display device 100 can be controlled remotely via a smart phone, tablet computer, or other type of Bluetooth-enabled computing device. Memory 206 may be any technically feasible type of memory, including a random access memory (RAM) module, a read-only memory (ROM) module, a hard disk, or a flash disk, among others, and stores therein a software application 208 that contain instructions for controlling the operation of the portable display device 100.

Figure 3:
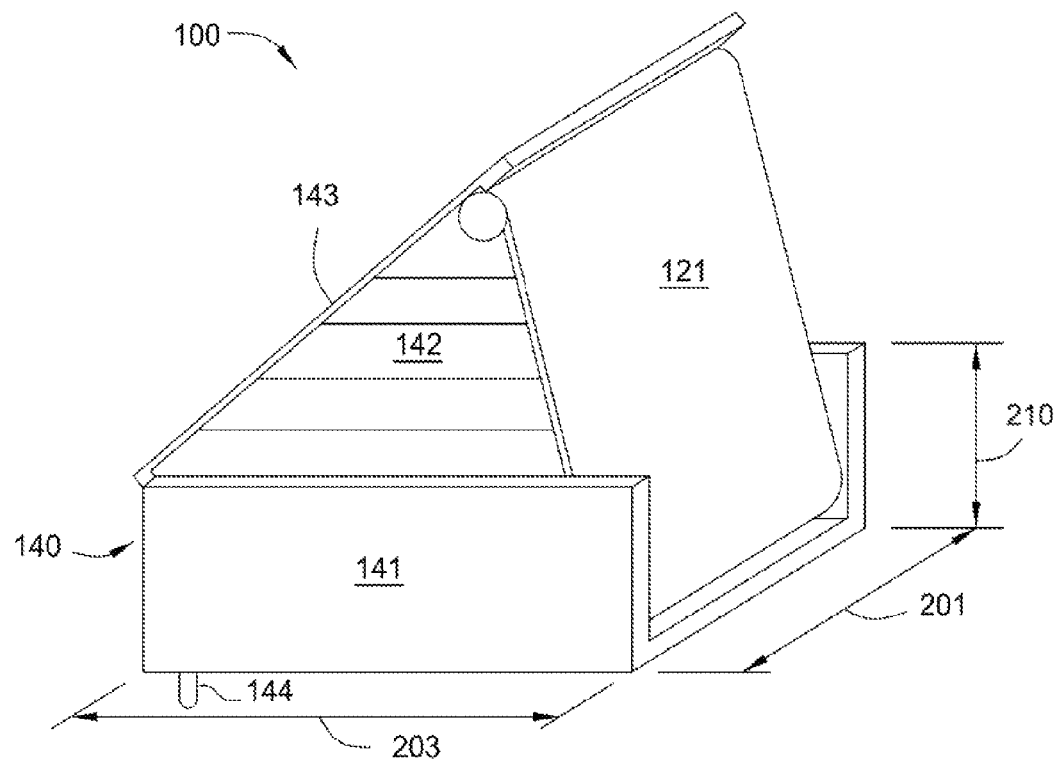
FIG. 3 illustrates a schematic perspective view of a portable display device with a display screen deployed for viewing, according to embodiments of the disclosure.

FIG. 3 illustrates a schematic perspective view of portable display device 100 with display screen 121 deployed for viewing, according to embodiments of the disclosure. Top panel 143 is lifted into place as shown either manually, using spring assist, and/or motorized assist, so that top panel 143 supports display screen 121. Power source 130 provides power for light module 110 to generate images on display screen 121 and to power speakers 160. In the embodiment illustrated in FIG. 3, portable display device 100 is substantially triangular in profile and display screen 121 is tilted from the normal when base 141 is resting flush with on a horizontal surface. In such an embodiment, leveling feet 144 can be deployed to adjust the orientation of base 141 to position display screen 121 substantially perpendicular to the horizontal plane when display screen 121 is deployed.

In one embodiment, display screen 121 is a 30" diagonal high-resolution screen having a 1920×1080 pixel format and portable display device 100 is configured to produce images on display screen 121 with a peak brightness of 1000 nits, which can be easily viewed in bright outdoor conditions. In such an embodiment, base 141 has a width 201 of 25 inches, a height 210 of only six inches, and a depth 203 of twelve inches, so that portable display device 100 is very compact when display screen 121 is stowed and top panel 143 is closed. In addition, portable display device is relatively lightweight while still capable of producing images acceptable for outdoor viewing conditions for an extended period. For example, assuming the average power consumption for light module 110 to be 30 W, and power source 130 has a power density of approximately 160 W-H/kg and a weight of 3.8 pounds, portable display device can generate images on display screen 121 with a peak brightness of 500 nits for eight hours. It is noted that in an embodiment in which portable display device 100 has the same configuration of light module 110 and power source 130 described above and display screen 121 is a 25" diagonal screen, portable display device 100 can generate images on display screen 121 for substantially longer than eight hours. A configuration of light module 110 that can generate images on a 30" diagonal display screen using approximately 30 W is described below in conjunction with FIGS. 5-8.

In addition to being compact, portable display device 100 is also lightweight. Specifically, for the embodiment described above having a 30 inch diagonal screen and a 3.8 pound battery, the total weight of portable display device 100 can be less than 20 pounds. In such an embodiment, display screen 121 is estimated to weigh approximately two pounds, each of speakers 160 weigh two pounds, collapsible enclosure assembly 140 is constructed of plastic materials and weighs approximately five pounds, and light module 110 and control system 150 together weigh no more than five pounds.

Figure 4:
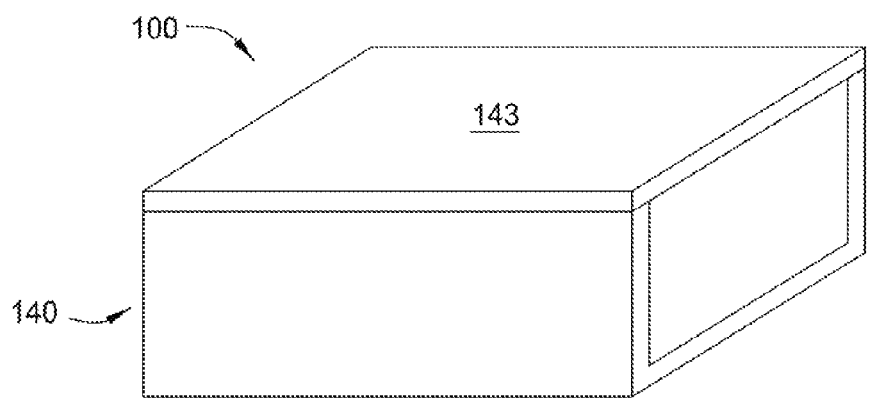
FIG. 4 illustrates a schematic perspective view of a portable display device with a display screen stowed for storage or transport, according to embodiments of the disclosure.

FIG. 4 illustrates a schematic perspective view of portable display device 100 with display screen 121 stowed for storage or transport, according to embodiments of the disclosure. As shown, display screen 121 has been disconnected from top panel 143 and stowed in collapsible enclosure assembly 140 by being rolled onto roller mechanism 122 of retractable screen assembly 120, and top panel 143 has been lowered into place to form a compact and lightweight housing.

According to embodiments of the disclosure, portable display device 100 may be a laser-based display apparatus, such as a video display system or a laser-phosphor display (LPD) system. In such embodiments, display screen 121 includes light-emitting materials or fluorescent materials to emit light under optical excitation from one or more scanning laser beams from light module 110 to produce images on display screen 121. The scanning laser beams are modulated or pulsed to convey information associated with an image to display screen 121. The modulation of the scanning laser beams is controlled in such a way that the scanning laser beam excites the light-emitting materials disposed on display screen 121 to emit red, green and blue colors to produce a desired image. Hence, the scanning laser beams carry the image but do not directly produce the visible light seen by a viewer. Instead, the color light-emitting fluorescent materials on display screen 121 absorb the energy of the scanning laser beams and emit visible light in red, green and blue, or other combinations of colors, to generate the color images seen by the viewer. One of skill in the art will appreciate that such a laser-based display apparatus advantageously requires much less power than LCDs or other displays known in the art. This is because the intensity of source light per pixel is proportional to the intended gray level of said pixel, so that an image-generating beams 111 draws more power for a bright image pixel and less power for a dimmer image pixel. Other technologies know in the art generally have a light source that emits light at full power at all times.

Figure 5:
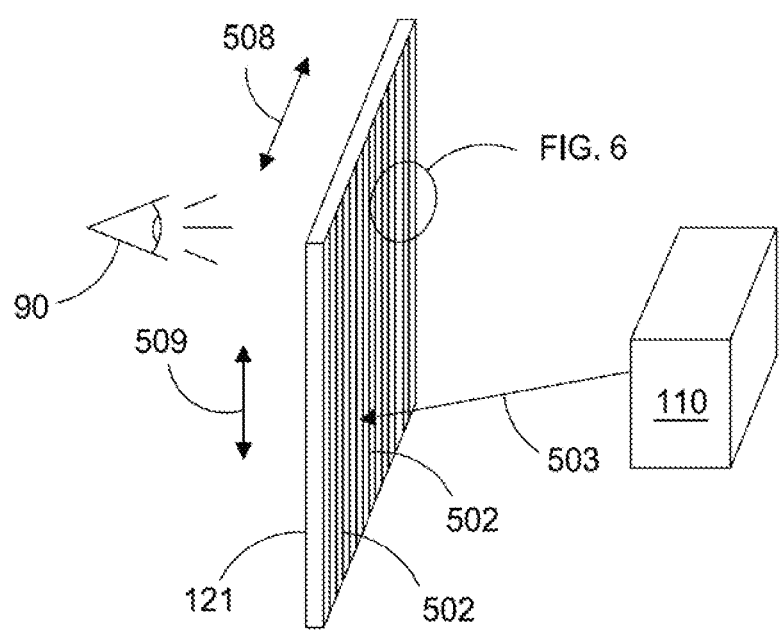
FIG. 5 is a schematic diagram of a light module and a display screen in a portable display device is configured as an LPD display system, according to one embodiment of the disclosure.

FIG. 5 is a schematic diagram of light module 110 and display screen 121 in portable display device 100 configured as an LPD display system, according to one embodiment of the disclosure. Display screen 121 includes phosphorescent stripes 502, and light module 110 is configured as a laser module that produces one or more scanning laser beams 503 to excite phosphorescent stripes 502. Phosphorescent stripes 502 are made up of alternating phosphorescent stripes of different colors, e.g., red, green, and blue, where the colors are selected so that they can be combined to form white light and other colors of light. Scanning laser beam 503 is a modulated light beam that is scanned across display screen 121 along two orthogonal directions, e.g., in the horizontal direction 508 and the vertical direction 509, in a raster scanning pattern to produce an image on display screen 121 for viewer 90.

It is noted that phosphorescent-containing materials are but one type of fluorescent material that may be disposed on display screen 121 that are suitable for forming color images. Various embodiments of the disclosure described herein using phosphors as the fluorescent materials are also applicable to displays with screens including other optically excitable, light-emitting, non-phosphor fluorescent materials. For example, quantum dot materials emit light under proper optical excitation and thus can be used as the fluorescent materials for systems and devices in this application, where semiconductor compounds such as CdSe and PbS, among others, can be fabricated in the form of particles with a diameter on the order of the exciton Bohr radius of the compounds as quantum dot materials to emit light. To produce light of different colors, different quantum dot materials with different energy band gap structures may be used to emit different colors under the same excitation light. Thus, in some embodiments, phosphorescent stripes 502 may include a quantum dot material as a light-emitting material that absorbs optical energy from scanning laser beam 503, rather than a phosphor-containing material.

It is further noted that laser excitation of light-emitting or fluorescent materials on display screen 121 is but one of various forms of optical excitation technique that can impart energy sufficient to cause the fluorescent materials to emit light or to luminesce. In other embodiments, such optical excitation may be generated by a non-laser light source that is sufficiently energetic to excite the fluorescent materials disposed on display screen 121. Examples of non-laser excitation light sources include various light-emitting diodes (LEDs), light lamps and other light sources that produce light at a wavelength or a spectral band to excite a fluorescent material that converts the light of a higher energy into light of lower energy and in the visible range.

Figure 6:
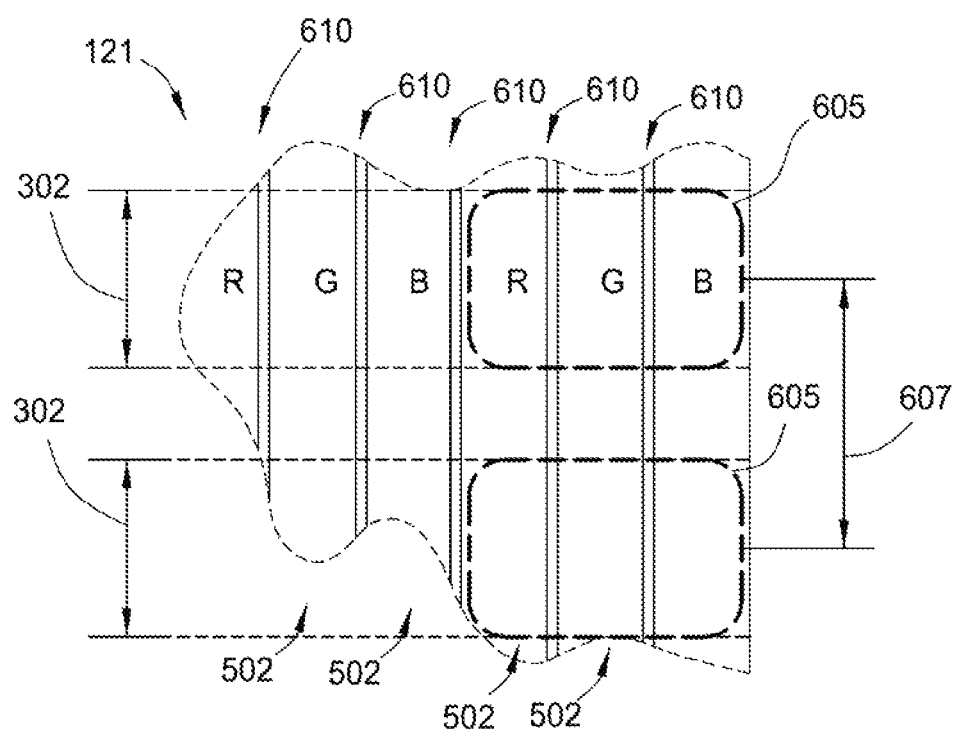
FIG. 6 is a partial schematic diagram of the portion of the display screen indicated in FIG. 5.

FIG. 6 is a partial schematic diagram of the portion of display screen 121 indicated in FIG. 5. FIG. 6 illustrates pixel elements 605, which each include a portion of a red, green, and blue phosphorescent stripe 502. The portions of the phosphorescent stripes 502 within a specific pixel element 605 are referred to herein as "subpixels," where each subpixel is used to emit one of the colors that makes up the pixel element 605. In some embodiments, each phosphorescent stripe 502 is separated from adjacent phosphorescent stripes by a stripe divider 610. It to be understood that it is contemplated that the stripe divider 610 may be omitted. The portion of the phosphorescent stripes 502 that belong to a particular pixel element 605 is defined by the laser scanning paths 302, as shown. Light module 110 forms an image on display screen 121 by directing scanning laser beam 503 along the laser scanning paths 302 and modulating scanning laser beam 503 to deliver a desired amount of optical energy to each of the red, green, and/or blue phosphorescent stripes 502 found within each pixel element 605. Each image pixel element 605 outputs light for forming a desired image by the emission of visible light created by the selective laser excitation of each phosphor-containing stripe in a given pixel element 605. Thus, modulation of the red, green, and blue portions of each pixel element 605 controls the composite color and image intensity at each image pixel element location.

In FIG. 6, one dimension of the pixel region is defined by the width of the three phosphorescent stripes 502, and the control of the laser beam spot size defines the orthogonal dimension. In other implementations, both dimensions of image pixel element 605 may be defined by physical boundaries, such as separation of phosphorescent stripes 502 into rectangular phosphor-containing regions or phosphorescent dots. In one embodiment, each of phosphorescent stripes 502 are spaced at about a 300 μm to 600 μm pitch, so that the width of pixel element 605 is on the order of about 1200 μm. Laser scanning paths 302 are separated by a screen pitch 607 of about 200 μm to about 300 μm.

Figure 7:
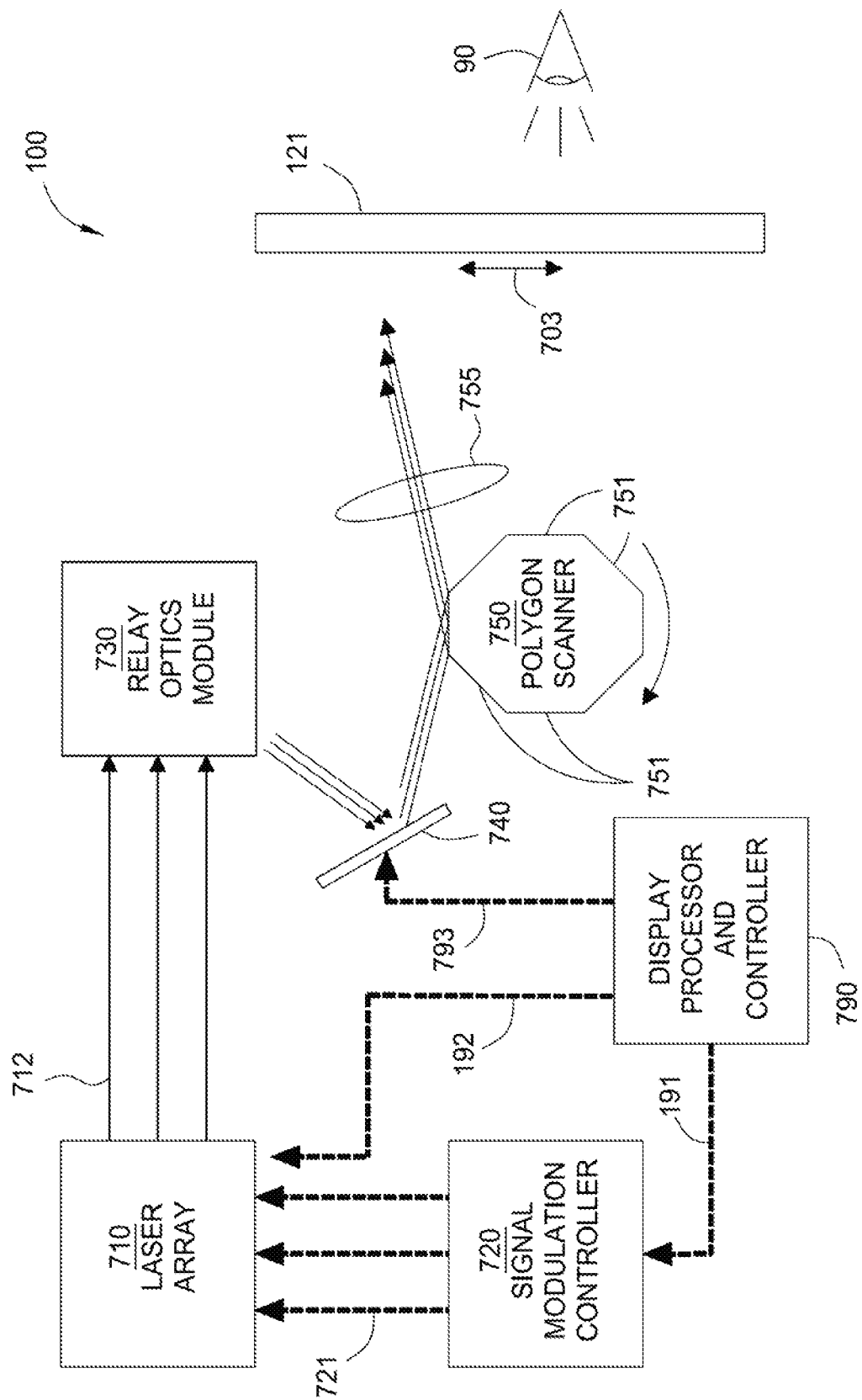
FIG. 7 is a schematic diagram of a light module and a display screen configured according to embodiments of the disclosure.

FIG. 7 is a schematic diagram of light module 110 and display screen 121 configured according to embodiments of the disclosure. Light module 110 includes a signal modulation controller 720, a laser array 710, a relay optics module 730, a mirror 740, a polygon scanner 750, an imaging lens 755, and a display processor and controller 790, configured as shown. The display processor and controller 790 is coupled to the mirror 740, laser array 710 and signal modulation controller 720 via data pathways 793, 192, 191 respectively.

Laser array 710 includes multiple lasers, e.g., 5, 10, 20, or more, and generates multiple laser beams 712 to simultaneously scan display screen 121. In one embodiment, the lasers in laser array 710 are ultraviolet (UV) lasers producing light with a wavelength between about 400 nm and 450 nm. Laser beams 712 are modulated light beams that are scanned across display screen 121 along two orthogonal directions, e.g., horizontally and vertically, in a raster scanning pattern to produce an image on display screen 121 for viewer 90.

Signal modulation controller 720 controls and modulates the lasers in laser array 710 so that laser beams 712 are modulated at the appropriate output intensity to produce a desired image on display screen 121. Signal modulation controller 720 may include a digital image processor that generates laser modulation signals 721. Laser modulation signals 721 include the three different color channels and are applied to modulate the lasers in laser array 710.

Together, relay optics module 730, mirror 740, polygon scanner 750, and imaging lens 755 direct laser beams 712 to display screen 121 and scan laser beams 712 horizontally and vertically across display screen 121 in a raster-scanning pattern to produce an image. For the sake of description, "horizontal" with respect to display screen 121 in FIG. 7 is defined as parallel to arrow 703 and "vertical" with respect to fluorescent screen 701 is defined as perpendicular to the plane of the page. Relay optics module 730 is disposed in the optical path of laser beams 712 and is configured to shape laser beams 712 to a desired spot shape and to direct laser beams 712 into a closely spaced bundle of somewhat parallel beams. Mirror 740 is a reflecting optic that can be quickly and precisely rotated to a desired orientation, such as a galvanometer mirror, a microelectromechanical system (MEMS) mirror, etc. Mirror 740 directs laser beams 712 from relay optics module 730 to polygon scanner 750, where the orientation of mirror 740 partly determines the vertical positioning of laser beams 712 on display screen 121. Polygon scanner 750 is a rotating, multi-faceted optical element having a plurality of reflective surfaces 751, e.g., 5 to 10, and directs laser beams 712 through imaging lens 755 to display screen 121. The rotation of polygon scanner 750 sweeps laser beams 712 horizontally across the surface of display screen 121 and further defines the vertical positioning of laser beams 712 on display screen 121. Imaging lens 755 is designed to direct each of laser beams 712 onto the closely spaced pixel elements 205 on display screen 121.

In operation, the positioning of mirror 740 and the rotation of polygon scanner 750 horizontally and vertically scan laser beams 712 across display screen 121 so that all of pixel elements 605 are illuminated as desired. To wit, as polygon scanner 750 rotates one of reflective surfaces 751 through incident laser beams 712, each of laser beams 712 is directed to sweep horizontally across display screen 121 from one side to the other, each laser beam following a different vertically displaced laser scanning path 302, thereby illuminating the pixel elements 605 disposed in these laser scanning paths 302 (laser scanning paths 302 and pixel elements 605 are illustrated in FIG. 6). Given N lasers in laser array 710 and N laser beams 712, a "swath" consisting of N laser scanning paths is illuminated as polygon scanner 750 rotates one of reflective surfaces 751 through incident laser beams 712. Because each of reflective surfaces 751 is canted at a different angle with respect to the horizontal, i.e., the plane of the page, when polygon scanner 750 rotates a subsequent reflective surface 751 through incident laser beams 712, the beams sweep horizontally across display screen 121 at a different vertical location. Thus, given N laser beams and M reflective surfaces 751 of polygon scanner 750, one rotation of polygon scanner 750 "paints" M×N rows of pixels. If display screen 121 is made up of more than M×N horizontal rows of pixels, then mirror 740 can be repositioned so that another block of M×N horizontal rows of pixels will be painted during the next rotation of polygon scanner 750. Once all pixels of display screen 121 have been illuminated, mirror 740 returns to an initial or top position and the cycle is repeated in synchronization with the refresh rate of the display.

In one embodiment, laser array 710 includes 34 lasers and polygon scanner 750 is an eight-facet polygon, thereby producing 272 horizontal lines on display screen 121 in a single rotation of polygon scanner 750. Using two positions of mirror 740 to paint display screen 121 twice with laser beams 712 then produces 544 horizontal lines on display screen 121, which is equivalent to a high-definition display. For a higher definition display, more rotations of polygon scanner 750 may be used. It is noted that the lasers in laser array 710 may have an optical power output of as little as 1 to 2 W and still generate images having an average peak brightness of 500 nits or more on a 30 inch diagonal high-definition screen. Thus, with an average power output of approximately 30 or 40 W, portable display device 100 can produce images that are viewable in an outdoor environment.

Because the phosphorescent stripes 502 are spaced at relatively narrow pitch, e.g., on the order of 300 μm-600 μm, precise alignment of light module 110 with respect to display screen 121 during operation of portable display device 100 is highly desirable. Misalignment of the lasers in laser array 710 by as little as 600 μm to 1200 μm or less can cause laser beams 712 to illuminate a different phosphorescent stripe 502 than the intended target phosphorescent stripe while being scanned across display screen 101, thereby resulting in significant image quality problems, including changes in color and brightness. Considering that display screen 121 and light module 110 are not permanently fixed in position with respect to each other, and portable display device 100 is configured to be repeatedly deployed from a compact and lightweight collapsible assembly, such precise alignment is difficult to achieve. In order to ensure such highly accurate alignment, in some embodiments portable display device 100 includes servo control mechanisms based on a designated servo beam that is scanned over the screen by the same optical scanning components that scan laser beams 712 across display screen 121. This designated servo beam is used to provide servo feedback control over the scanning excitation beams, i.e., laser beams 712, to ensure proper optical alignment and accurate delivery of optical pulses during operation of portable display device 100. In some embodiments, the servo beam is at a different wavelength of light than laser beams 712, e.g., the servo beam may be an infra-red (IR) beam, and display screen 121 is configured to reflect the servo beam to produce servo feedback light. In other embodiments, laser beams 712 can be used to produce servo feedback light in addition to or in lieu of a dedicated IR servo beam. In such embodiments, an image can be generated on display screen 121 that is centered vertically and horizontally without adjustments or other intervention on the part of a user.

Figure 8:
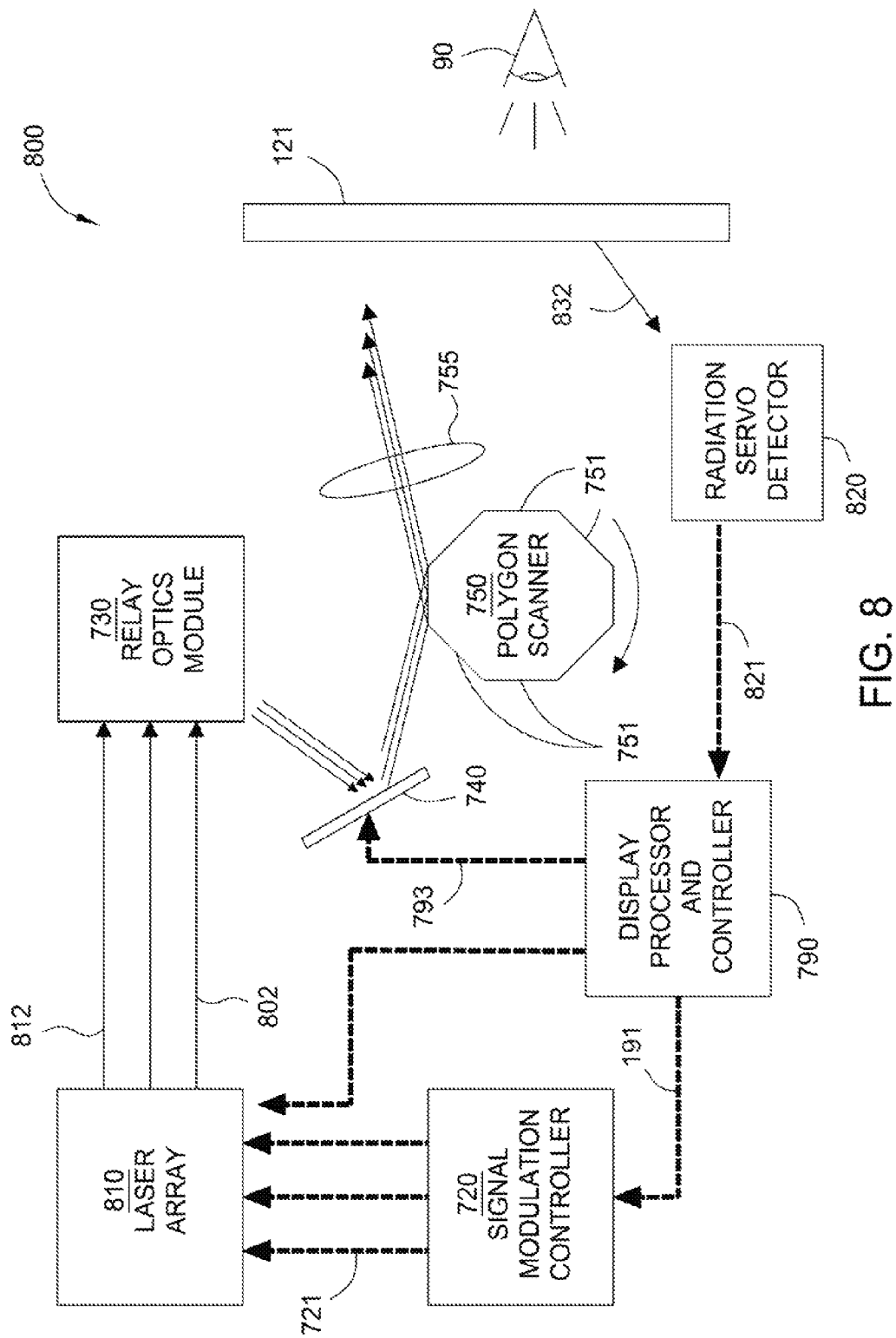
FIG. 8 is a schematic diagram of a light module configured with a servo beam, according to embodiments of the disclosure.

FIG. 8 is a schematic diagram of a light module 800 configured with a servo beam, according to embodiments of the disclosure. Light module 800 is a laser module substantially similar to laser module 110 in organization and operation, with the following exceptions. Laser array 810 includes, in addition to laser array 710 described above in conjunction with FIG. 7, a laser diode for generating a servo beam 802. Laser beams 812 include laser beams 112 for exciting phosphors and servo beam 802 to provide servo feedback control over laser beams 112. Display screen 121 includes reflective servo reference marks disposed on display screen 121, and these reflective servo reference marks reflect servo beam 802 away from display screen 121 as servo feedback light 832. Light module 800 also includes one or more radiation servo detectors 820, which detect servo feedback light 832 and direct servo detection signals 821 to display processor and controller 790 for processing. The servo reference marks may be located between phosphorescent stripes 502 in the active display area of display screen 121, in an off-screen calibration module, or both. In some embodiments, one servo lock system is utilized in portable device 100 to maintain proper alignment of laser beams 812 vertically and a different servo lock system is utilized to maintain proper alignment of laser beams 812 horizontally.

Figure 9:
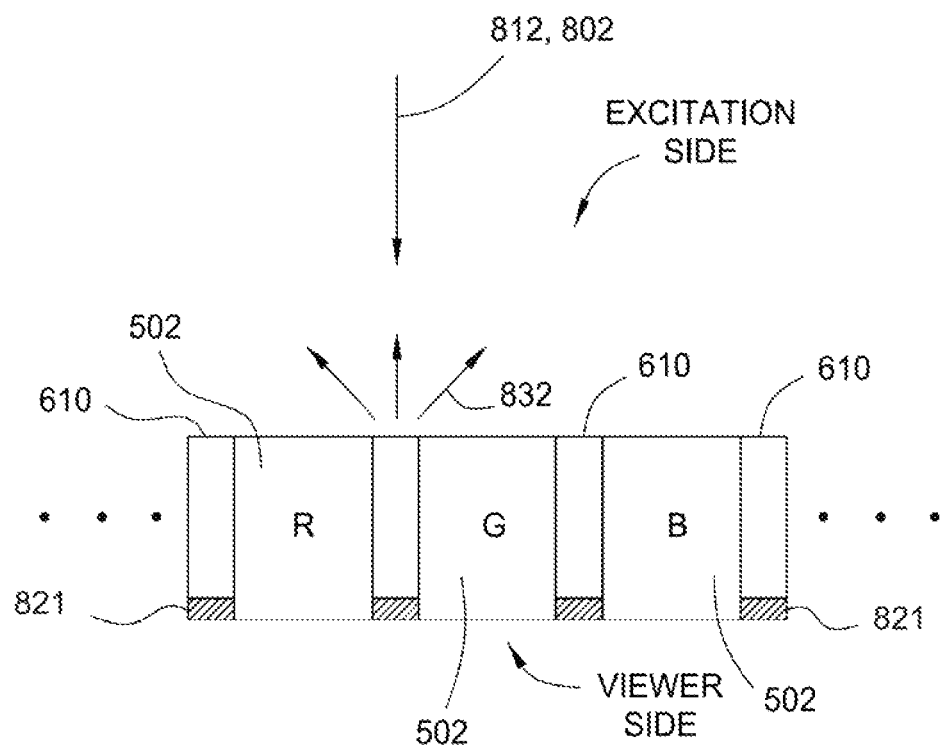
FIG. 9 schematically illustrates a display screen configured to provide a servo feedback light, where the servo feedback light can include reflected light from a servo beam and/or reflected light from laser beams.

In some embodiments, servo feedback light 832 is used to align laser beams 812 horizontally with respect to display screen 121, i.e., laser beams 812 are each aligned with the proper phosphorescent stripe 502. FIG. 9 schematically illustrates display screen 121 configured to provide servo feedback light 832, where servo feedback light 832 can include reflected light from servo beam 802 and/or reflected light from laser beams 812. Display screen 121 includes stripe dividers 610 that are disposed between phosphorescent stripes 502 and made optically reflective to the servo and excitation beams so that the reflection can be used as feedback light 832. The stripe divider 610 can also be made reflective and opaque to incident light to optically isolate adjacent phosphorescent stripes 502 to enhance contrast and to reduce cross talk there between. Phosphorescent stripes 502 are less reflective to servo beam 802 and laser beams 812 than stripe dividers 610 so that servo feedback light 832 exhibits a spike in intensity each time servo beam 802 and/or laser beams 812 are scanned across a stripe divider 610. An absorbent black layer may be coated on each stripe divider 610 on the viewer side of display screen 121 to reduce glare of ambient light to viewer.

Figure 10:
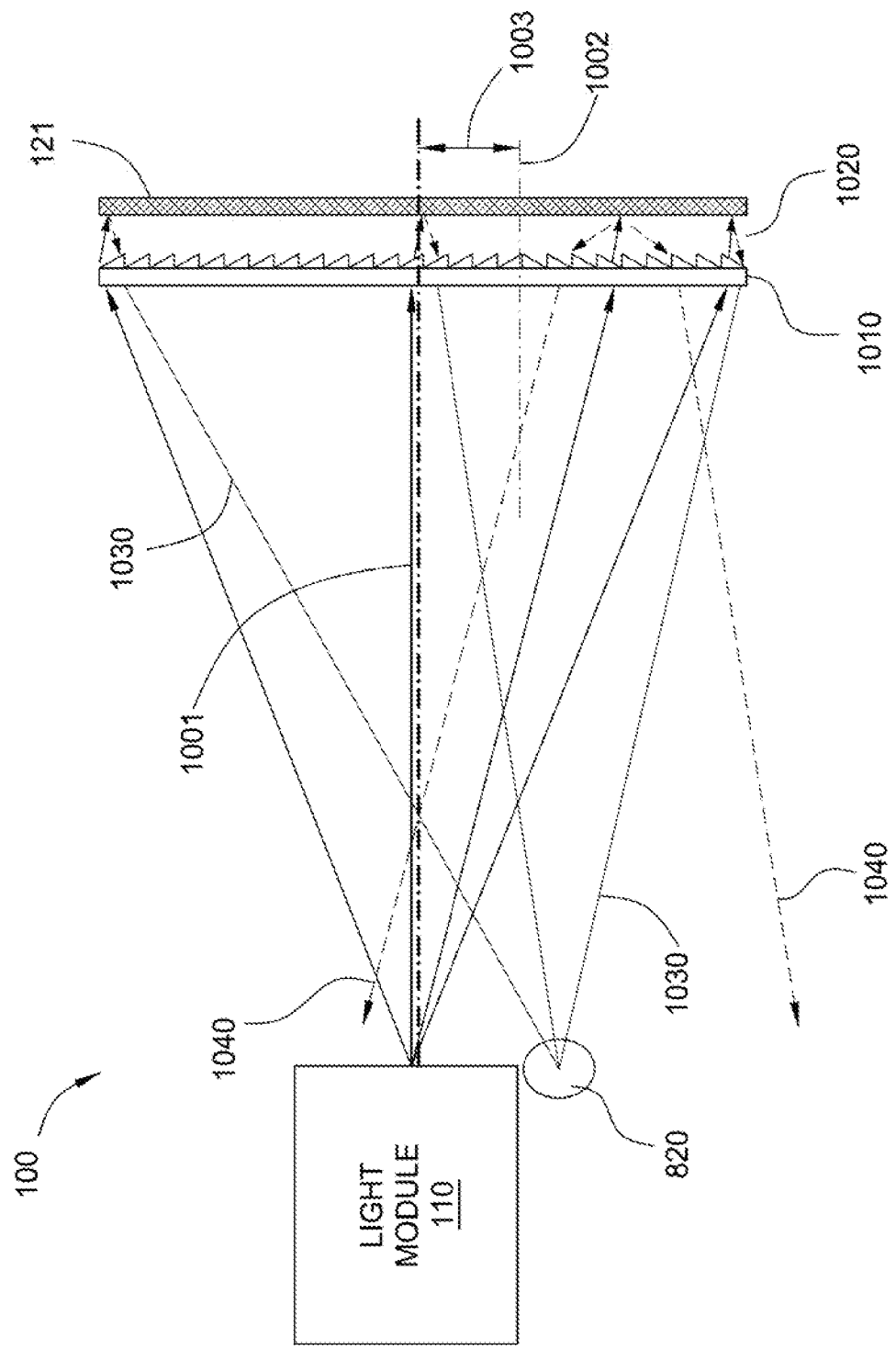
FIG. 10 schematically illustrates a configuration of a display screen that facilitates the detection of a servo feedback light based on the specularly reflective surfaces of stripe dividers and the optically diffusive surfaces of phosphorescent stripes, according to an embodiment of the disclosure.

In each horizontal scan of servo beam 802 and laser beams 812 across phosphorescent stripes 502 the reflections produced by stripe dividers 610 can be used to indicate horizontal positions of the stripe dividers 610, spacing between two adjacent stripe dividers 610, and horizontal positions servo beam 802 and laser beams 812 with respect to display screen 121. Therefore, reflections from stripe dividers 610 can be used for servo control of the horizontal alignment between laser beams 812 and phosphorescent stripes 502. In some embodiments, stripe dividers 610 have a specularly reflective surface and phosphorescent stripes 502 have an optically diffusive surface, in order to enhance the detectability of servo feedback light 832. In such embodiments, stripe dividers 610 have a smooth surface on the excitation side of display screen 121 to produce a specular reflection of incident IR, such as incident servo beam 802. In contrast, phosphorescent stripes 502 have a roughened surface that diffuses reflected IR light, and therefore produces diffused reflections that spread in different directions to form a diffused reflection cone. Such a diffused reflection cone is illustrated in FIG. 10. It is noted that the two specularly reflective and optically diffusive surfaces on the excitation side of display screen 121 have approximately the same optical transmission for light at the wavelength of laser beams 812.

FIG. 10 schematically illustrates a configuration of display screen 121 that facilitates the detection of servo feedback light 832 based on the specularly reflective surfaces of stripe dividers 610 and the optically diffusive surfaces of phosphorescent stripes 502, according to an embodiment of the disclosure. Laser module 110 projects and scans both servo beam 802 and laser beams 812 onto display screen 121 with stripe dividers 610 acting as specularly reflective IR feedback marks. Laser module 110 has a symmetric optic axis 1001 around which the beam scanning is performed, and a Fresnel lens layer 1010 and an air gap 1020 are disposed adjacent display screen 121, as shown. Fresnel lens layer 1010 is an optical telecentric lens that may be configured as a layer incorporated within the structure of display screen 121. Because a Fresnel lens is formed from a relatively thin layer of material, Fresnel lens layer 1010 can readily be incorporated into the display screen 121 as an additional layer without significantly decreasing the flexibility of display screen 121. Fresnel lens layer 1010 is configured to couple servo beam 802 and laser beams 812 onto display screen 121 with substantially normal incidence to display screen 121. Fresnel lens layer 1010 is configured with its symmetric optic axis 1002 oriented parallel to symmetric optic axis 1001 of laser module 110 and with an offset 1003 therebetween as shown.

Fresnel lens layer 1010 is optically positioned between laser module 110 and the phosphorescent stripes of display screen 121 to direct servo feedback light 832 to radiation servo detector 820. Specifically, symmetric optic axis 1002 of Fresnel lens layer 1010 is oriented parallel to and offset from symmetric optic axis 1001 of laser module 110. In this way, light from servo beam 802 is specularly reflected as beam 1030 when incident on stripe dividers 610 and is directed by Fresnel lens layer 1010 to radiation servo detector 820, while light from servo beam 802 is diffusely reflected as beam 1040 when incident on phosphorescent stripes 502 and is spread by Fresnel lens layer 1010 over relatively large area so that only a very small fraction of the diffusely reflected light from servo beam 802 is received by radiation servo detector 820. Consequently, servo detection signals 821 from radiation servo detector 820 can be used to determine a hit by servo beam 802 on a stripe divider 610 configured as a servo reference mark.

In some embodiments, the light of laser beams 812 can also be reflected back by the specular and diffusive regions on display screen 121. Hence, the specularly reflected light at the excitation wavelength is also directed back to radiation servo detector 820. A wavelength selective optical beam splitter can be used to split the collected light at the servo wavelength and the collected light at the excitation wavelength into two separate signals for separate optical detectors, where radiation servo detector 820 receives the IR servo light and another servo detector receives the feedback light at the excitation wavelength.

In some embodiments, servo feedback light 832 is used to align laser beams 812 vertically with respect to display screen 121 and with respect to each other. In some embodiments, peripheral servo reference marks are positioned outside the active display area of display screen 121, such as in an off-screen calibration module, and are used to produce feedback light 832 in FIG. 8. In such embodiments, the servo reference marks may include scribe lines that, when traversed by servo beam 802 and/or laser beams 812, produce servo feedback light 832 that allows controller 150 of portable display device 100 to determine the vertical position of servo beam 802 and/or laser beams 812.

Figure 11:
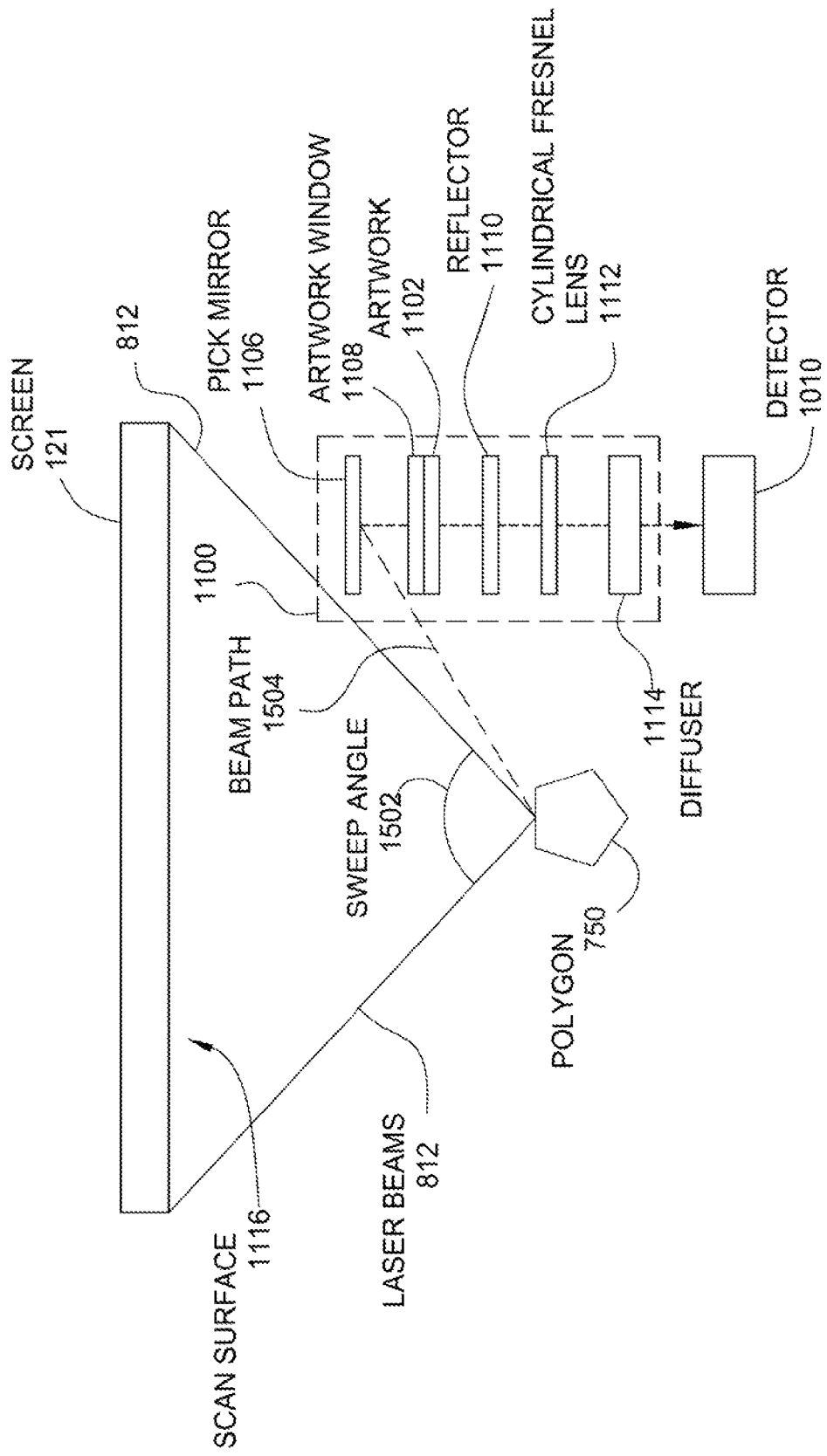
FIG. 11 schematically illustrates a display screen configured with an off-screen calibration module to determine the vertical position of a servo beam and/or laser beams, according to an embodiment of the disclosure.

FIG. 11 schematically illustrates display screen 121 configured with an off-screen calibration module 1100 to determine the vertical position of servo beam 802 and/or laser beams 812, according to an embodiment of the disclosure. Off-screen calibration module 1100 is disposed outside of the active display area of display screen 121 and includes artwork 1102 and optical components for directing servo feedback light 832 to a detector 820. The display screen 121 includes a scan surface 1116. The term "artwork" is used herein to describe a surface having lines and marks drawn thereon to enable calibration. Artwork 1102 may include a pair of vertical scribe lines and a set of scribes that are transmissive to servo beam 802 and/or laser beams 812. The optical components of off-screen calibration module 1100 include a pick mirror 1106, an artwork window 1108, a reflector 1110, a cylindrical Fresnel lens 1112, and a diffuser 1114. Pick mirror 1106 reflects incident light beams through artwork window 1108 to artwork 1102. Reflector 1110 reflects the transmitted portion of incident laser beams to cylindrical Fresnel lens 1112, which directs the reflected laser beams to diffuser 1114. Detector 820 then detects the diffuse laser beams. Scribes included in artwork 1102 have geometries that transmit different amounts of incident light depending on the vertical position at which the incident light traverses the scribes. For example, the scribes included in artwork 1102 may be diamond-shaped, triangular, etc. Thus, the servo feedback light 832 detected by detector 820 varies in brightness depending on the vertical position of the incident light beam being measured, and controller 150 can determine the vertical position of a desired light beam. Controller 150 can then adjust mirror 740 accordingly to precisely position laser beams 812 as desired with respect to display screen 121.

Additional examples of an LPD-based display system configured with a servo beam that allows fine-tuning of the position of scanning laser beams on a display screen are described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009.

In sum, embodiments of the disclosure set forth a portable display apparatus for displaying high-resolution still and video images suitable for viewing in outdoor conditions. One advantage of the present disclosure includes a truly portable, high-definition display device that can operate for extended periods without an external power source—even when displaying images having high average brightness. In addition, embodiments of the present disclosure provide a compact and easily setup display device that does not need calibration or other alignment procedures to be performed by a user.

Figure 12:
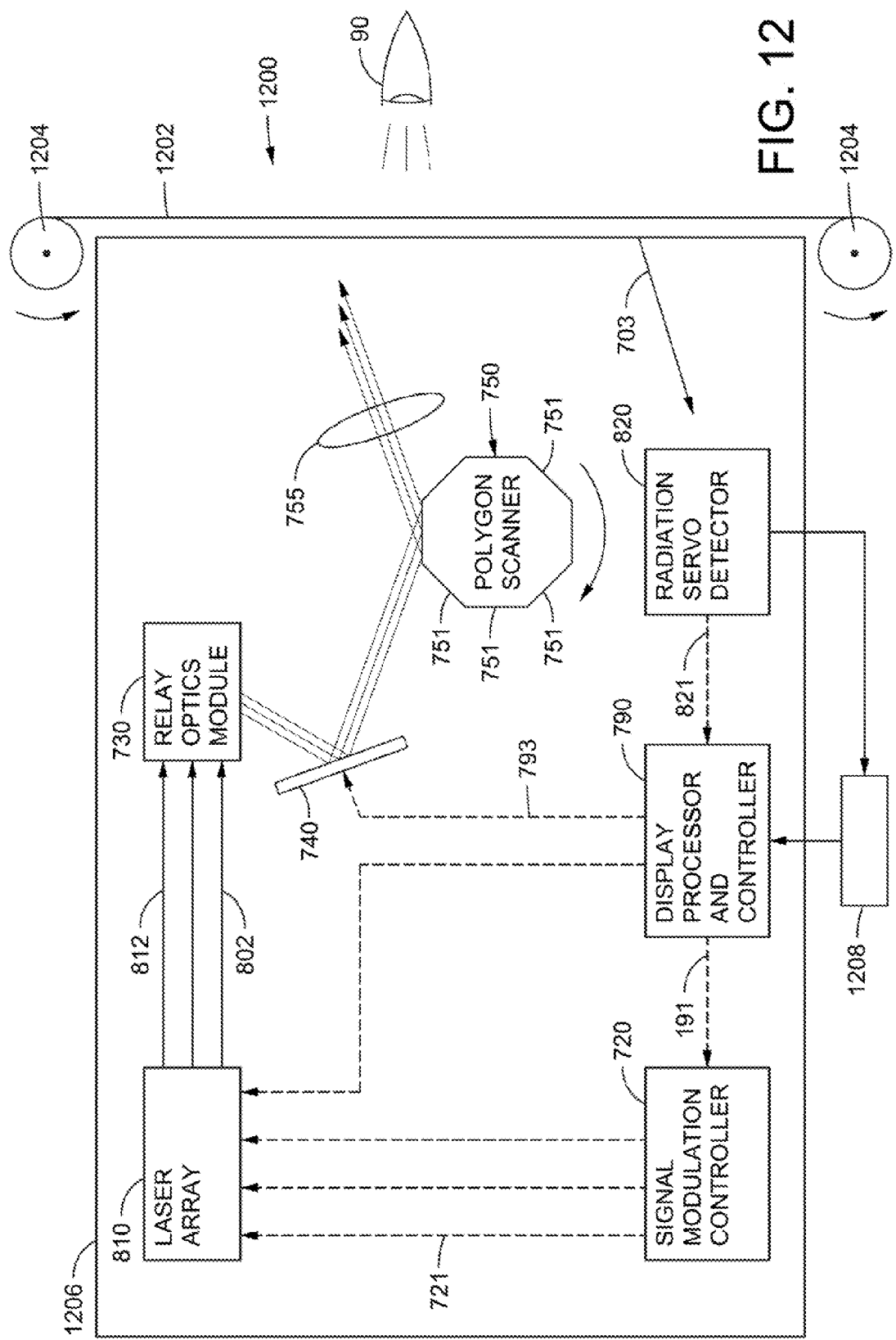
FIG. 12 is a schematic illustration of a light module with a servo beam and rollable screen according to one embodiment.

In one embodiment, the display apparatus may comprise a rollable screen. FIG. 12 is a schematic illustration of a display apparatus according to one embodiment. As shown in FIG. 12, the system 1200 includes a screen 1202 that is rollable from a first roll 1204 to a second roll 1204 to extend the screen 1202 in front of the light from the light source (in this example, laser array 810). The screen 1202 encloses a side of the enclosure 1206.

Figure 13:
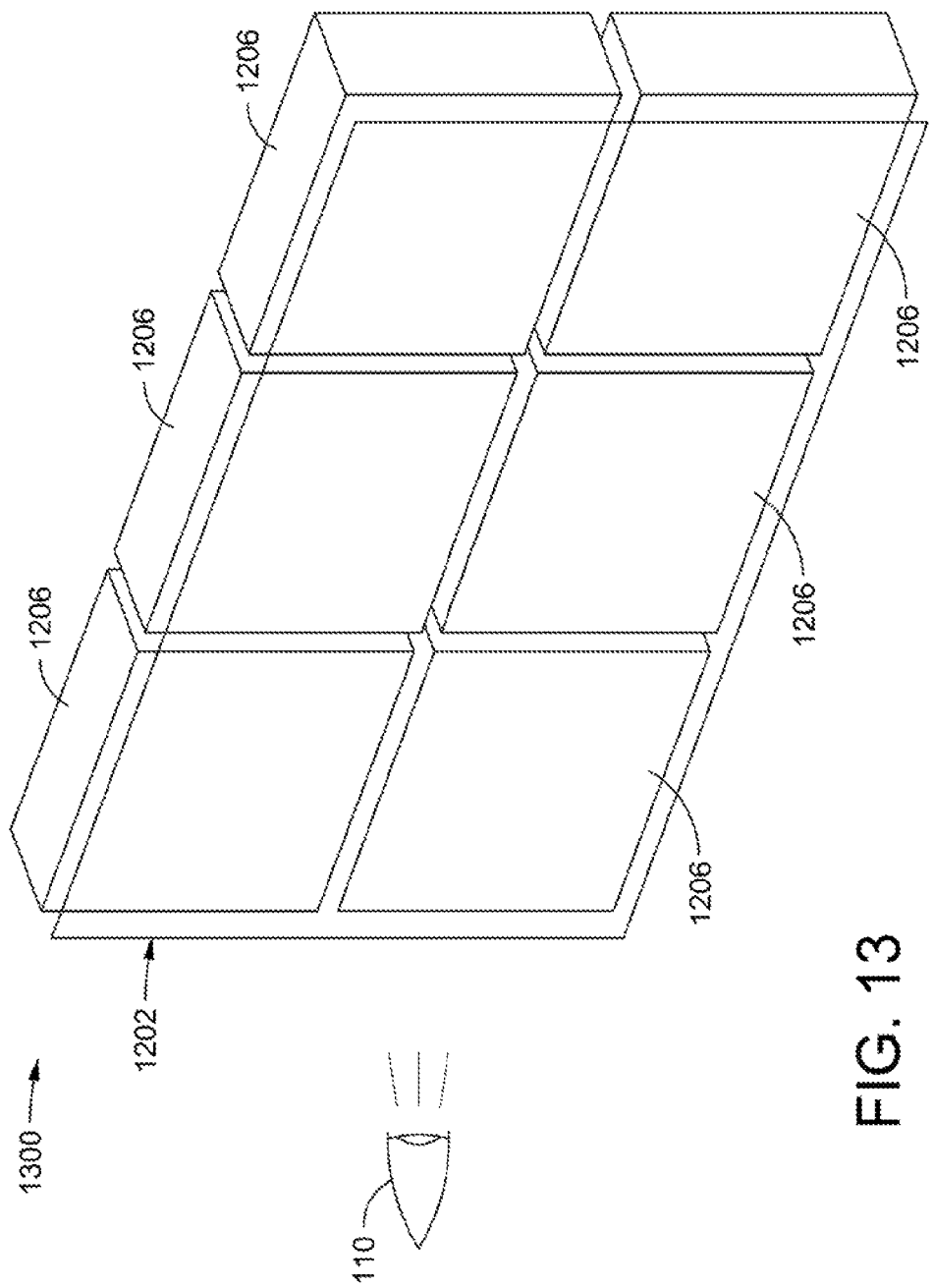
FIG. 13 is a schematic illustration of a system comprising a rollable screen and multiple enclosures according to one embodiment.

As shown in FIG. 13, a system 1300 includes a plurality of enclosures 1206 (six shown) with a screen 1202 that is in front of, and in some embodiments at least partially encloses, the enclosures 1206. For clarity, the rolls 1204 are not shown, but it is to be understood that the screen 1202 is rollable. The system 1300 is a portable system. The individual enclosures 1206 can be easily transported and the screen 1202 may be rolled up independent of the individual enclosures 1206 so that the entire system may be transported with ease to different locations. The ability to roll up the screen 1202 permits easier transport through doorways and easier storage of the screen 1202 without fear of the screen 1202 being exposed to damaging items during transport. Similarly, the enclosures 1206 may be individually moved and stacked in any desired orientation during transport. As will be appreciated, the ability to 'tear down' the system 1300 permits easier transport of the system 1300 as opposed to a large, fixed or non-rollable screen attached to one or more enclosures 1206 that must remain in a fixed orientation. Such a system would unduly complicate transportation and storage. The portable system 1300 permits easy replacement of enclosures 1206, and contents therein, together with replacement of a screen 1202.

Figure 14:
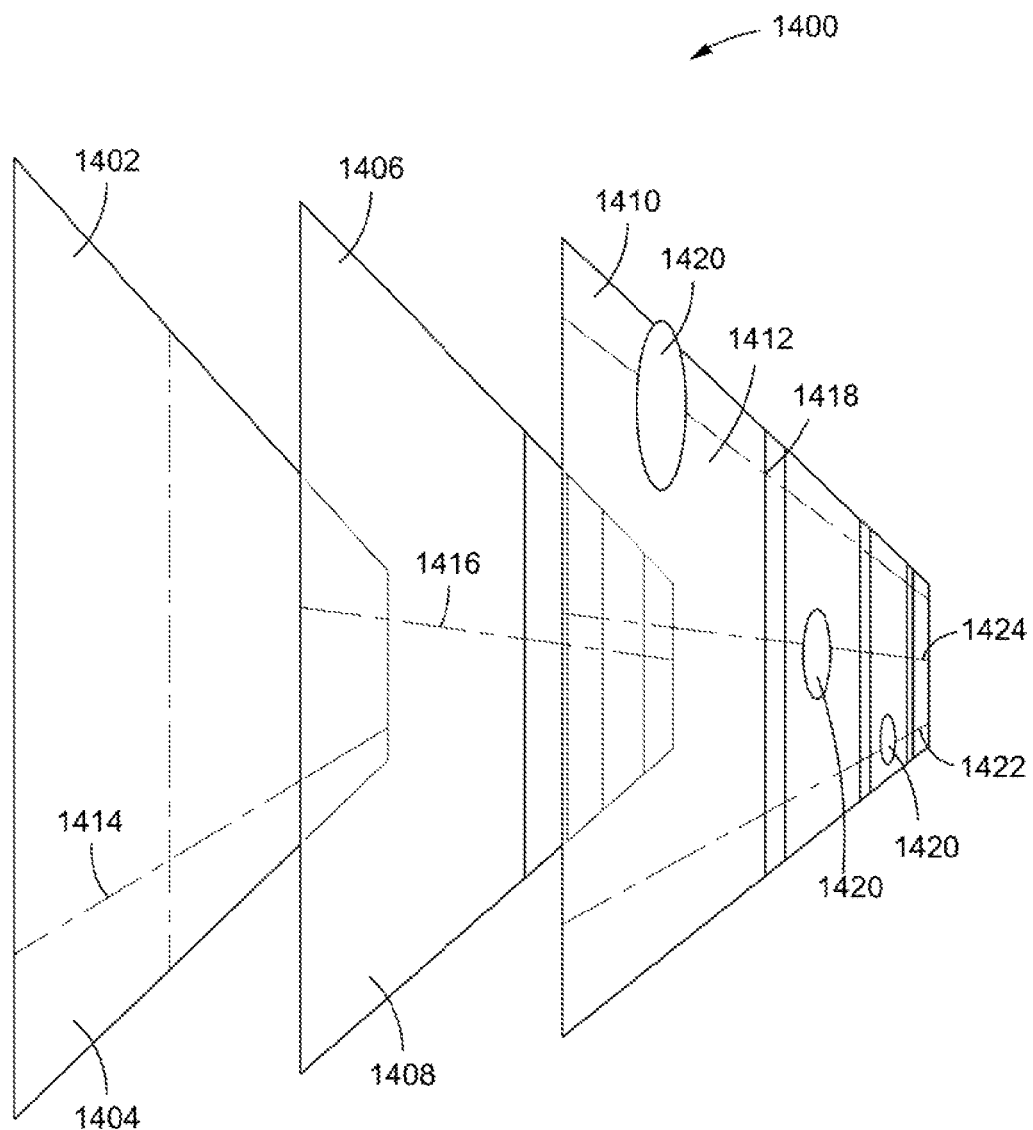
FIG. 14 is a schematic illustration of a multi layer screen according to one embodiment.

The screen 1202 may comprise multiple layers and multiple pieces. The multiple pieces may comprise individual screens whose edges abut one another to collectively form a larger screen. The multiple pieces are individual screens that are disposed next to one another such that the screens abut on another to collectively form a single, large screen. The multiple pieces are quilted together as will be described below with regards to FIGS. 16A and 16B. FIG. 14 is a schematic illustration of a screen 1400 having multiple layers according to one embodiment. The multi-layer screen 1400 has a vertical gap sheet alignment. In the vertical sheet alignment situation, there are vertical strips of phosphor and vertical strips of standoff dividers. Standoff dividers are elements that are disposed between adjacent phosphor regions. In the multi-layer screen 1400, the breaks between placed layers within the screen vertically positioned to each other are placed in a manner to not occur in line with the phosphor regions. The gaps between adjacent layer films for the vertically placed layer films may or may not be in the same location as the above or below layer film gaps. As depicted in FIG. 14, there are three layers: a servo layer comprises of servo layer sheets 1402, 1404; a phosphor layer comprises phosphor layer sheets 1406, 1408; and a filter layer comprises filter layer sheets 1410, 1412. Each of the three layers has abutting layers extending the overall dimension of the composite sheet of the three layers. Alternatively, the placed layers may be horizontally positioned such that the gaps between adjacent layer films may or may not be in the same location as the layers above or below the layer film gaps.

In one embodiment, the servo layer gap 1414, where the abutting two servo layers abut each other, is located in one position. The preferred location is in line with the scan of the laser beam across the screen, such that the projected servo gap 1422 is approximately centered along the scan of the beam. The next layer in the sheet layer stack is the phosphor layer. Again here the phosphor layer film gap 1416, where the abutting two phosphor layers abut each other, is located in a second position, distinct from overlapping with the position of the first layer gap 1414 and is projected as projected phosphor gap 1424. This second positional gap 1416 is located again in line with a scan of the laser beam as the laser beam scans across the composite sheet, but distinct from the first gap position and hence distinct from the first laser beam scan position. The subsequent layer in the sheet layer stack is the filter layer. Again here the filter layer film gap 1418, where the abutting two filter layers abut each other, is located in a third position, distinct from the overlapping with the position of the first layer gap 1414 and the second layer gap 1416. This third positional gap 1418 is located again in line of a scan 1420 of the laser beam as the laser beam scans across the composite sheet, but distinct from the first gap position and hence distinct from the first laser beam scan position as well as distinct from the second gap position and hence distinct from the second laser beam scan position.

Figure 15:
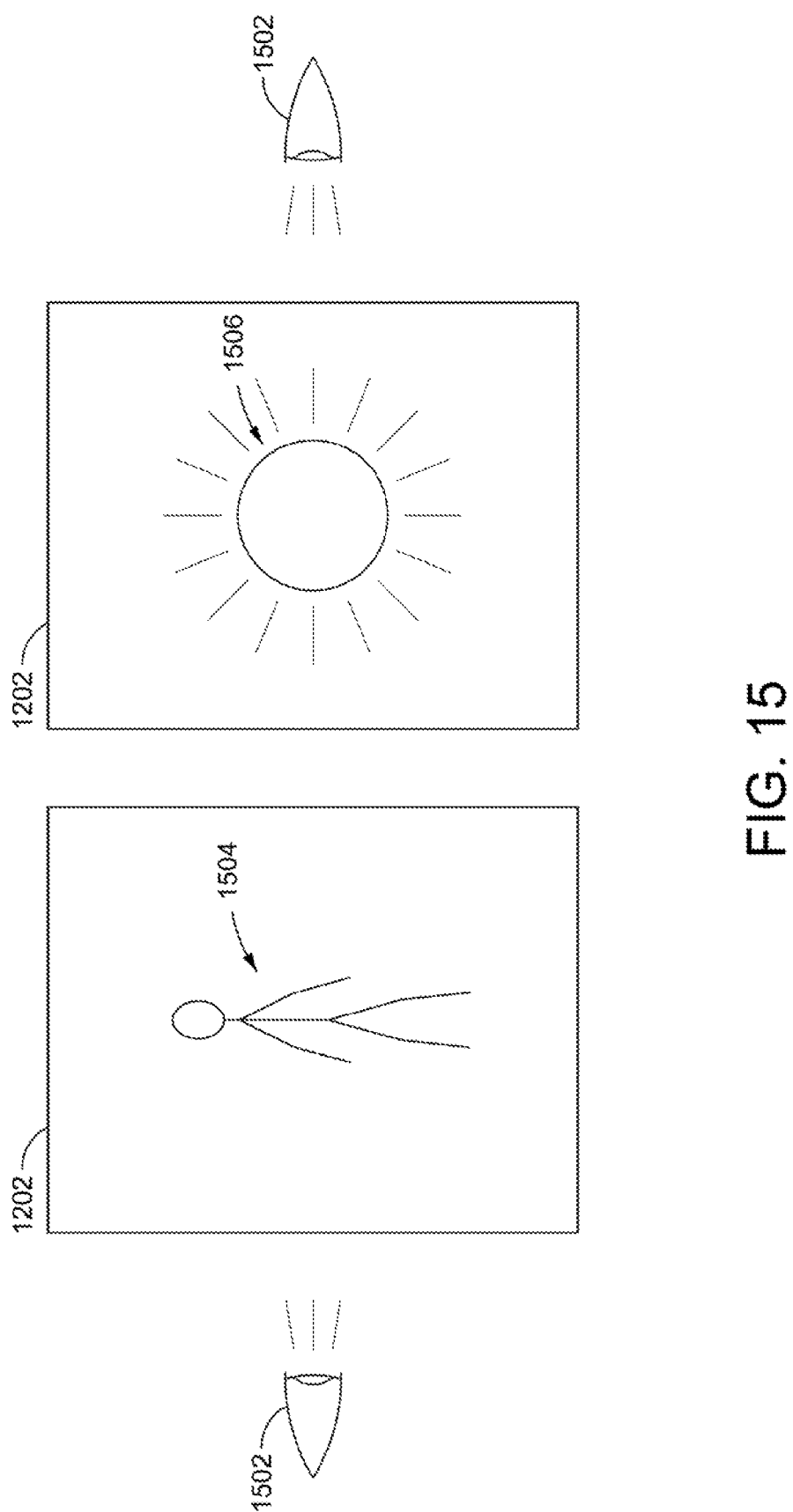
FIG. 15 is a schematic illustration of a stereo image displayed on a screen.

In some instances, it may be desirable to display multiple images on the same screen whereby different viewers see different images on the same screen at the same time. As shown in FIG. 15, both viewers 1502 are viewing the same screen 1202. For simplicity of understanding, the screen 1202 has been shown twice, but it is to be understood that the viewers 1502 are viewing the same screen 1202 at the same time. However, the viewers 1502 are viewing different images 1504, 1506. The viewers 1502 may see different images 1504, 1506 due to the perspective of the viewer 1502 or due to special viewing glasses worn by the user. As will be appreciated, the system 1300 may function such that two different viewers 1502 view the same screen 1202 at the same time yet see different images. It is envisioned that, the system may be designed to produce an audio file distinct for each different image 1504, 1506 such that each viewer 1502 may view a different movie (and listen to the corresponding audio with headphones), for example, while watching the same screen 1202. While not shown, a film patterned retarder (FPR) may be present as yet another layer or set of layers of the screen.

An FPR is a transparent or partially transparent sheet that may comprise multiple layers. In one embodiment, the multiple layers includes a polarizing film, such as triacetyl cellulose (TAO) film, which can be used to polarize the light emanating for the phosphor region. The multiple layers can further include alternating left and right circularly polarizing wave plates, which are used to separate information to the viewer wearing polarization glasses. The FPR can create a plurality of right and left circular polarization regions that establishes distinct left eye visible regions and right eye visible regions. The FPR regions and can be separated into various organizations, such as columns, rows, checkerboard patterns or other formations which would allow an approximately equal division of the image produced on the screen between the right eye polarization regions and the left eye polarization regions. The FPR can be arranged in columns that correlate to the pixel width.

When multiple enclosures 1206 are utilized, the various beams from the light sources may be easily misaligned. Therefore, properly aligning the beams may be necessary. Thus, each enclosure 1206 may have its own light engine module and servo detector. The feedback from the individual servo detectors can be fed back to a common control unit 1208. Each of the enclosures 1206 are coupled to the control unit 1208. More specifically, the servo detector 820 of each enclosure 1206 is coupled to the control unit 1208. The control unit 1208 determines whether the light sources are misaligned. If there is an alignment problem, the control unit feed information to the display processor and controller 790 of the appropriate enclosure 1206, which then adjusts alignment of the light hitting the screen 1202. The alignment may necessitate adjusting all of the enclosures 1206 or, in some instances, select enclosures 1206.

When multiple pieces are used in forming a screen 1202, the gap (i.e., seam) between pieces abutting one another may be covered with a narrow layer or tape. A screen that has viewable seams is not desirable. Therefore, when a screen includes multiple pieces coupled together, transparent adhesive tape may be used. The internal reflections visible to screen viewers when an edge of the tape is scanned by a beam spot produced by a scanning beam in a scanning beam system is minimized by applying the tape in such a manner that the total surface area of the edge of the tape that falls within the beam spot produced by the scanning beam is minimized. In some implementations, the internal reflections are minimized by applying the tape between horizontal and vertical seams between each screen of the multiple screens wherein the tape has non-straight edges. When multiple pieces are quilted together to form a large screen, the seaming of the screen may have some discontinuities between adjacent screen layers that may function as servo marks to enable feedback and thus, beam adjustment for timing and/or alignment.

Figures 16A, 16B:
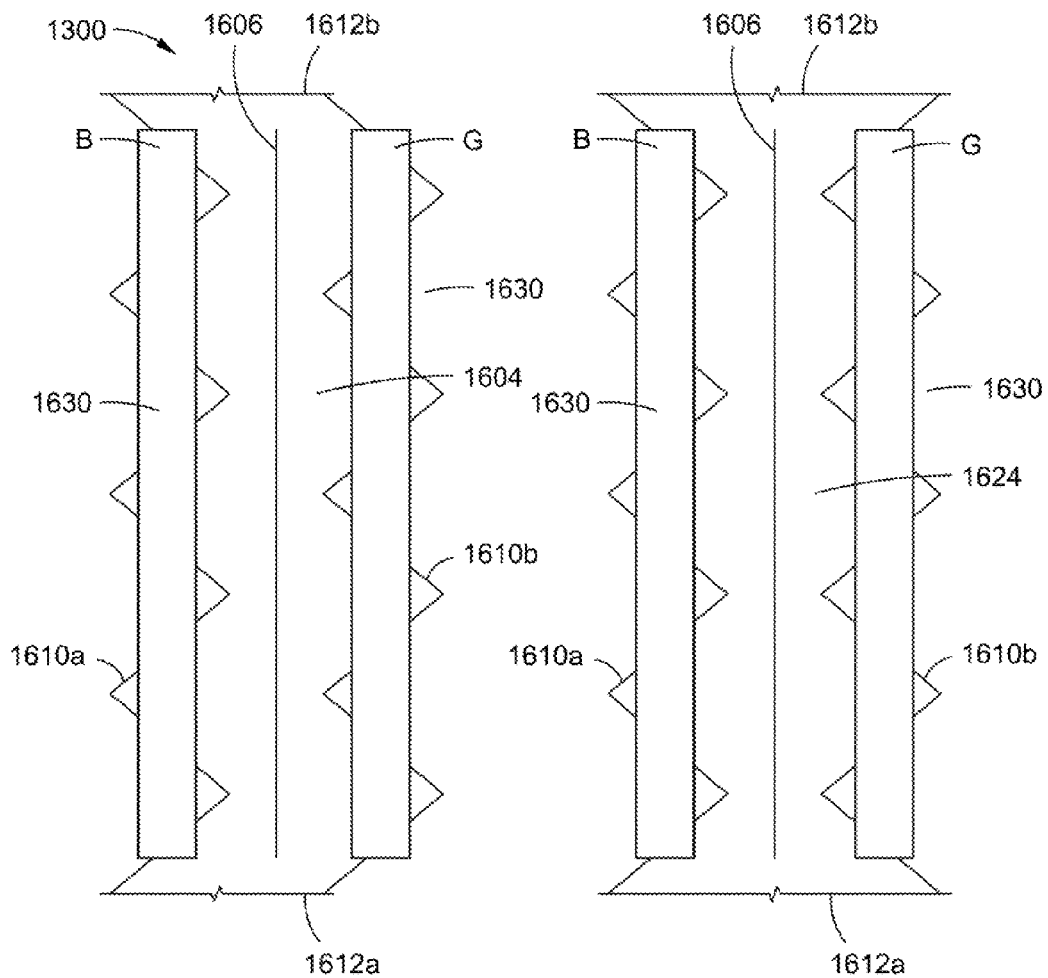
FIGS. 16A-16B are schematic diagrams of implementations of tape coupling two pieces together that abut one another to produce a large seamless screen according to implementations described herein.

FIGS. 16A-16B are schematic diagrams of implementations of tape coupling two pieces together that abut one another to produce a large seamless screen according to implementations described herein. FIG. 16A is a schematic diagram of one implementation of display system 1300 using tape 1604 to couple two pieces together to produce a large seamless screen according to implementations described herein. The positioning of the tape 1604 relative to phosphor stripes 1630 and seam 1606 is depicted. The tape 1604 is transparent. A seam or "gap" 1606 is formed between the abutting edges of the pieces. The tape 1604 has two opposing major edges 1610a, 1610b which are positioned on opposite sides of the seam 1606 and two parallel minor edges 1612a, 1612b which are positioned perpendicular to the seam 1606. The side of the tape 1604 contacting the pieces has an adhesive fastener disposed thereon and operable to couple the two pieces together. The adhesive fastener may be an acrylic adhesive selected to optimally adhere to the respective surfaces of each piece.

The major edges 1610a, 1610b of tape 1604 are "non-straight" or oblique so as to minimize the total surface area of the major edge of the tape that falls within the beam spot produced by the scanning beam. The major edges 1610a, 1610b of tape 1604 are serrated or "triangular" in FIGS. 16A and 16B, but it is to be understood that other shapes, such as curved shapes, may be used as well.

FIG. 16B is a schematic diagram of one implementation of display system 1300 including tape 1624 to couple two screens together to produce a large seamless screen according to implementations described herein. The tape 1624 is similar to tape 1620 except that major side 1610b of tape 1604 is shifted such that major side 1610a and major side 1610b of FIG. 16B are mirror images of each other.

A screen suitable for use in the devices of this application may include one or more fluorescent materials to form a fluorescent layer sandwiched between two layers D1 (a dichroic layer) and D2 to receive excitation laser light through the first dichroic layer D1 and the emitted colored light from the fluorescent layer exits the screen via the second layer D2. The first dichroic layer D1 is designed to transmit the excitation laser light, e.g., UV light, and to reflect visible light. The second layer D2 may be designed to transmit visible light and block the excitation laser light, e.g., UV light. In addition, the visible light by the fluorescent layer, which originally tends to emit in all directions, is blocked by the dichroic D1 layer from returning to the light engine. Accordingly, the overall utility efficiency of the emitted light and the brightness of the screen are enhanced. The D1 and/or D2 layers may be PET substrates, coextruded multilayer CM, or other film layers and individually may be less than 200 um each.

Figure 17A:
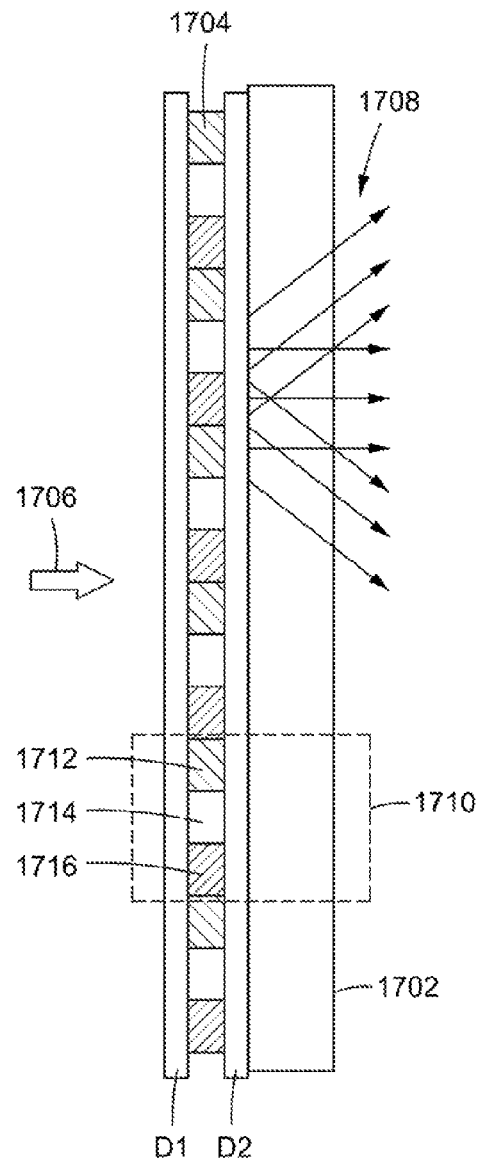
FIGS. 17A, 17B, 18 and 19 show examples of screen designs and structures with filter layers on two opposite sides of the phosphor layer to enhance the optical efficiency of the screens.
Figure 17B:
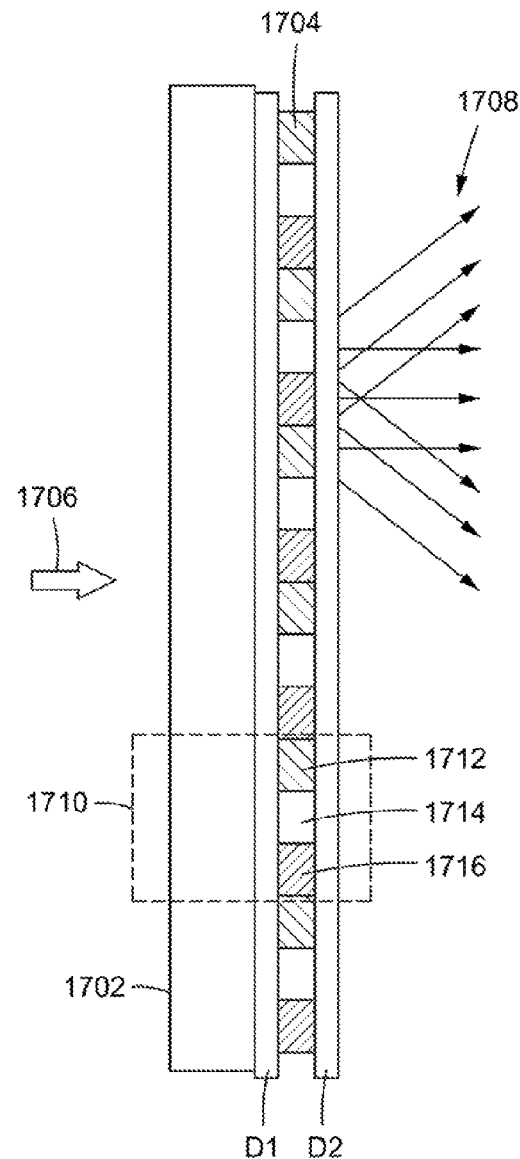

FIGS. 17A and 17B illustrate two examples based on the above screen design. A substrate 1702 is provided to support the dichroic layer D1 (for transmitting UV and reflecting visible light), and second layer, D2 (for transmitting visible and reflecting UV light) and the fluorescent layer 1704 which is the phosphors. FIG. 17A shows an example in a surface incident configuration where the substrate 1702 is on the side of the D2 layer and the emitted light 1708 exits the screen through the substrate 1702. This configuration provides better transmission properties for the excitation light 1706 such as UV light, a minimum back reflection towards the excitation laser, and allows the substrate 1702 side to act as a shield from the viewer side. FIG. 17B shows an example in a substrate-side-incident configuration where the substrate is on the side of the D1 layer and the incident excitation laser light 1706 enters the screen through the substrate. In one example, the UV laser light may be at around 405 nm. The D1 layer reflects visible light which may have a wavelength greater than 430 nm and transmits UV light with a wavelength shorter than 415 nm or 400 nm through to the phosphor layer. In this example, the D2 layer may reflect UV light with a wavelength shorter than 415 nm or even less than 400 nm and transmits visible light with a wavelength greater than 430 nm. Anti-reflection (AR) coatings may be used to further enhance the efficiency of the screen. The substrate-side-incident configuration allows the substrate to be treated to form an optical diffractive or "power" element and provides better transmission of the colored light to the viewer side.

One or more phosphors are used to form the fluorescent layer. The substrate may be made out of a plastic or PET material that is capable of transmitting light in the spectral range of the visible light, e.g., 400-800 nm.

In FIGS. 17A and 17B, a region may be formed in the phosphor layer to separate two adjacent phosphor stripes where each color pixel 1710 in this example includes red, green and blue subpixels 1712, 1714, 1716. This design can be used to improve the resolution and contrast of the screen. A phosphor separator wall may exist between the phosphor stripes in order to confine the light emitted by that phosphor from spreading into neighboring phosphors that emit different colors.

The excitation laser light in the above described systems, such as a laser scanner display and a laser video display, may enter the fluorescent layer of the screen at an angle due to the scanning action of a beam scanning module to scan the excitation beam across the screen. This incident angle varies with the entry position of the laser light. The direction of the laser light should be as close to the normal direction to the fluorescent layer as possible to improve the image quality. In one implementation for controlling the incident angle of the laser light to the fluorescent layer, an optical mechanism may be implemented at the entry to the screen to direct the incident laser beam to be normal or approximately normal to the screen.

Figure 18:
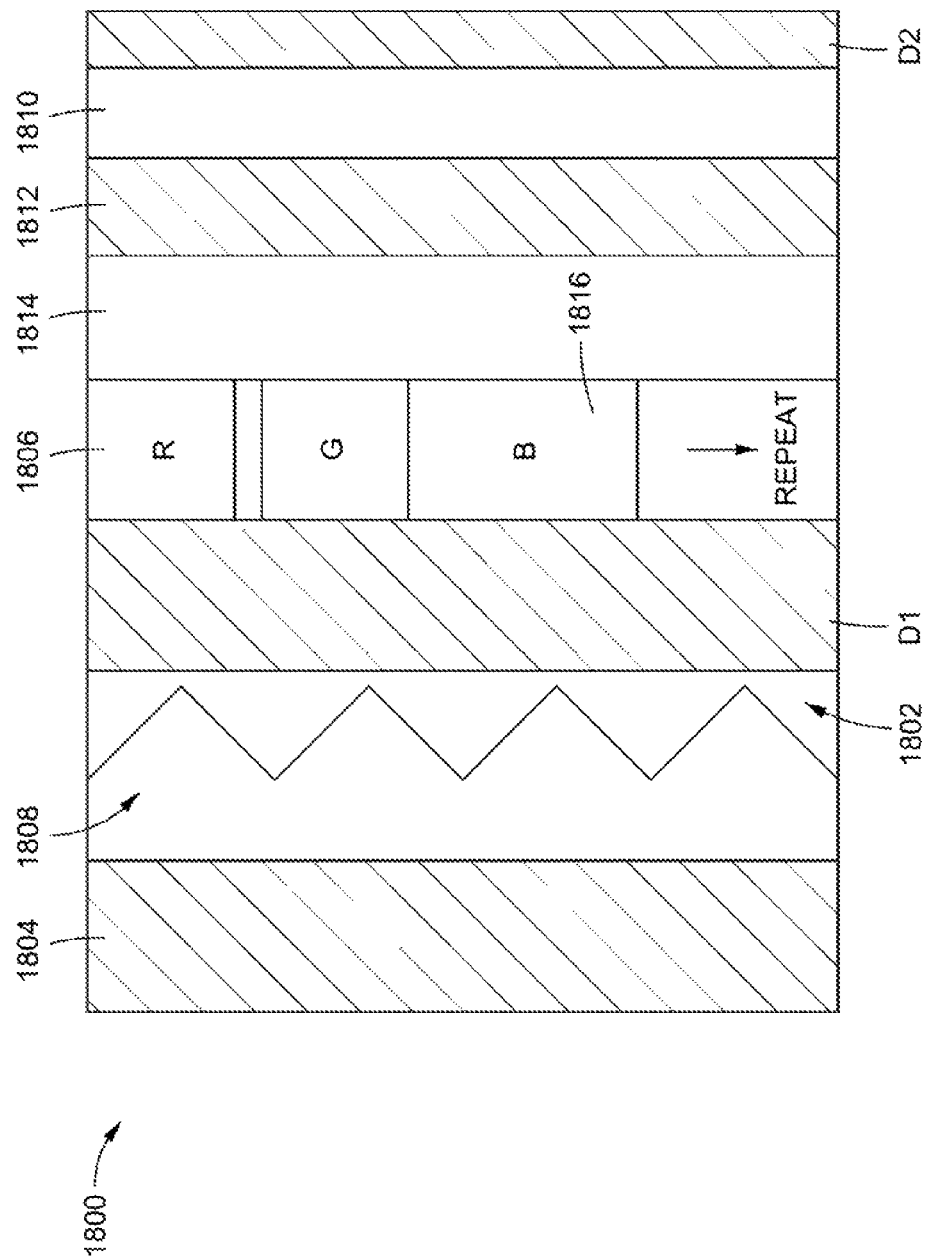

FIG. 18 shows an example of a screen 1800 with a gap 1802 or an optical material with a different index than the D2 layer and may be used to create a difference in the refractive index from the phosphor to the next layer of the screen. In one embodiment, the gap 1802 may comprise air or other optical material to create a different in the index of refraction. Other layers may also be formed in the screen, such as an antireflection layer 1804 at the entrance surface of the screen for receiving the excitation laser light, and a dichroic filter layer D1 on the laser-entry side of the fluorescent layer 1806. The antireflection layer 1804 may be deposited on the substrate 1808 or deposited on the transfer film or on the transfer film and then applied to the substrate 1808 with optical PSA. The substrate 1808 may be structured surface (i.e., Fresnel lens) that redirects incidental laser light to make it substantially normal to the screen. The substrate 1808 may comprise glass, acrylic, polycarbonate, polyethylene terephthalate or other optically transmitting material. The structure surface of the substrate 1808 may have an antireflective layer 1804 to reduce transmission losses. In addition, a Servo layer, a screen gain layer 1812, a contrast enhancing layer 1810, and a second dichroic layer D2 (a UV blocker) may also be provided in the screen. In this example, the first dichroic layer D1 is designed to transmit light from 405 nm to 410 nm with a transmission of about 99.75% and to reflect visible light from 440 nm to 410 nm with a reflectivity of about 95%; the anti-reflection layer 1804 is designed to transmit UV light at 405 nm with a transmission of about 99.75%. The screen gain layer 1812 is designed to optically enhance the brightness, or a combination of these and other structures. The contrast enhancing layer 1810 may include a color-selective absorbing pigment in each subpixel to absorb ambient light and to transmit light in the color of that subpixel. The servo layer has servo reflection marks, which in one embodiment specularly reflects the servo beam and in another embodiment dispersingly reflects the servo beam. The remainder of the servo layer may in one embodiment pass the servo beam, and in another embodiment may specularly reflect the servo beam and in another embodiment may dispersingly reflect the servo beam. The order of the layers may vary with screen designs. An encapsulation layer 1814 to seal off phosphors and black matrix layer 1816 to separate pixels and different subpixels within one pixel may also be present The composite panel roll radius is governed by: a—total film thickness, b—the shear strength of the glues and c—the area of glue between the layers (all these govern the amount of shear (ums) one can tolerate between the layers once rolled), d—the phosphor property is next as well (and besides acting like a coated layer on top of PET) its role is only that we need to space it from the next PET layer (so it acts as detriment to the rigidity of the structure).

Figure 19:
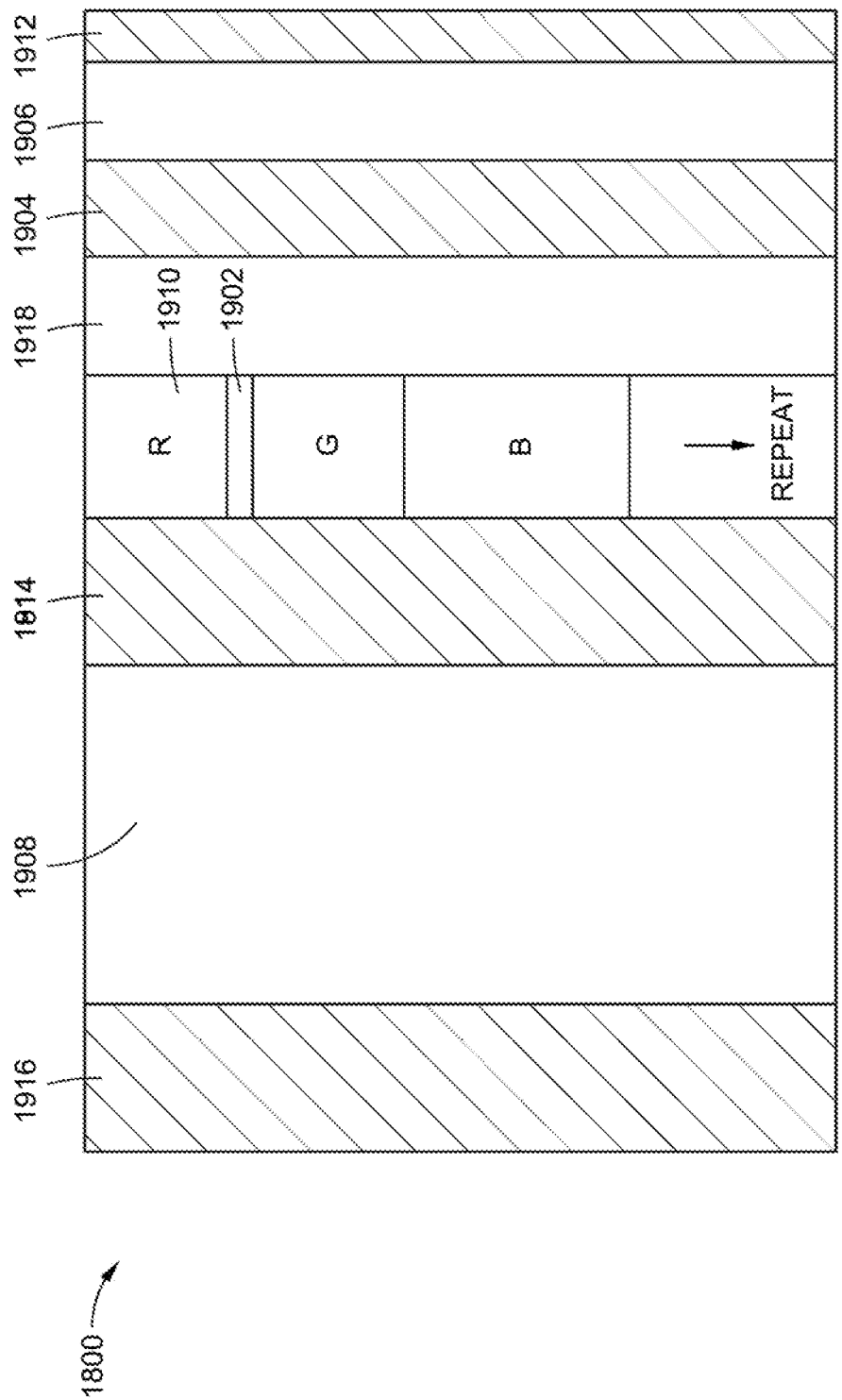

FIG. 19 shows an example of a screen 1900 based on the design in FIG. 18 with additional details on the various layers such as the layer 1902 with dividers between different phosphor sub pixels to reduce the color mixing or cross talk, a gain layer 1904 for enhancing the brightness and increasing the viewing angle, and a contrast enhancing layer 1906 to reduce the reflection of the ambient light to the viewer. A substrate 1908, anti-reflection layer 1916, encapsulating layer 1918, and UV blocking layer 1912 may also be present. The dividers between different fluorescent regions are used to in part to separate mixing of adjacent fluorescent regions and may be implemented in various configurations. In one example, the dividers may be optically reflective to reflect emitted colored light at large angles within a fluorescent region and therefore such dividers can act as a "light pipe" to improve directionality of each emitting fluorescent region. The dividers may also be optically absorbent to absorb the emitted colored light at large angles. The dividers may be physical grooves formed at the boundaries of different phosphor regions. This design of the phosphor layer 1910 allows different phosphors to be individually fabricated and laminated together by, e.g., using a suitable optical adhesive or an optical pressure-sensitive film. Implementations of the disclosure contemplate the use of a material having a low-index of refraction that is disposed in the region between phosphor regions and the standoff dividers or any separation between the phosphor regions. Alternatively, the low index of refraction material may be air. In another implementation, a low index of refraction region may also be immediately adjacent the phosphor regions on the side towards the viewer whereby in one embodiment, the low index of refraction material may be air.

The above dichroic layer 1914 used in the screens may be implemented in various configurations. It may be desirable that such a dichroic layer 1914 be made of relatively inexpensive materials and be relatively easy to manufacture. Multiple dielectric layers can be designed to construct various wavelength-selective optical filters by controlling the refractive indices and the physical thickness values of the layers. For example, multiple layers of alternating high and low index dielectric layers may be designed to achieve desired wavelength-selective reflection and transmission spectra.

For example, multiple sheets of films with different refractive indices may be laminated or fused together to construct a composite sheet as the D1 dichroic layer. The multiple layers are not brittle so that the multiple layers may bend without breaking when rolled onto a roller. In some implementations, multiple layers of two different materials with different indices may be used to form a coextruded composite multilayer film stack by placing the layered materials in an alternating manner and has an inherit ductability/elasticity. The coextruded film stack can be attached to each other via a PSA layer and still be rollable at a certain radius based on the total thickness of the layers and the adhesion strength between them. Such a composite sheet for the D1 layer is essentially an optical interference reflector that transmits the excitation light (e.g., UV light) that excites the phosphor materials which emit colored visible light and reflects the colored visible light. Such composite sheets may be formed of organic, inorganic or a combination of organic and inorganic materials. The multiple-layer coextruded composite sheet may be flexible. A flexible multi-layer composite sheet may be formed from polymeric, non-polymeric materials, or polymeric and nonpolymeric materials. Exemplary films including a polymeric and non-polymeric material are disclosed in U.S. Pat. No. 6,010,751 entitled "Method for forming a multicolor interference coating" and U.S. Pat. No. 6,172,810 entitled "Retroreflective articles having polymer multilayer reflective coatings" which are incorporated by reference in their entirety as part of the specification of this application. An all-polymer construction for such composite sheets may offer manufacturing, cost and rollability benefits. If high temperature polymers with high optical transmission and large index differentials are utilized in the interference filter, then an environmentally stable filter that is both thin and very flexible can be manufactured to meet the optical needs of short-pass (SP) and (LP) filters. In particular, coextruded multilayer interference filters as taught in U.S. Pat. No. 6,531,230 entitled "Color shifting film" can provide the precise wavelength selection as well as a filter film in a large area based on cost effective manufacturing. The entire disclosure of U.S. Pat. No. 6,531,230 is incorporated by reference as part of the specification of this application. The use of polymer pairs having high index differentials allows the construction of very thin, highly reflective mirrors that are freestanding, i.e. have no substrate but are still easily processed for constructing large screens. Such a composite sheet is functionally a piece of multi-layer optical film (MOF) and includes, e.g., alternating layers of PET and co-PMMA to exhibit a normal-incidence reflection band suitable for the screen applications of this application. As an example, an enhanced specular reflector (ESR) made out of a multilayer polyester-based film from 3M Corporation may be configured to produce the desired dichroic reflection and transmission bands for the present application. Examples for various features of multilayer films are described in U.S. Pat. No. 5,976,424 entitled "Method for making multilayer optical films having thin optical layers," U.S. Pat. No. 5,080,467 entitled "Biphenyl derivatives for photostabilization in pulsed optical darkening apparatus and method" and U.S. Pat. No. 6,905,220 entitled "Backlight system with multilayer optical film reflector," all of which are incorporated by reference as part of the specification of this application. Regardless of the materials utilized, if different materials are utilized, then the coefficient of thermal expansion for the different materials should be as close to identical as possible in order to ensure the multilayers do not delaminate due to thermal expansion. If the layers have different thermal expansion coefficients, then it is theoretically possible that the one layer may expand significantly more than another layer and thus lead to delamination. Thus, if different materials are used for the different layers, then the materials should have as close a coefficient of thermal expansion as possible in order to ensure the layers thermally expand without delamination. The order of the encapsulationg, gain, contrast enhancing and UV blocking layers may vary.

Figure 20A:
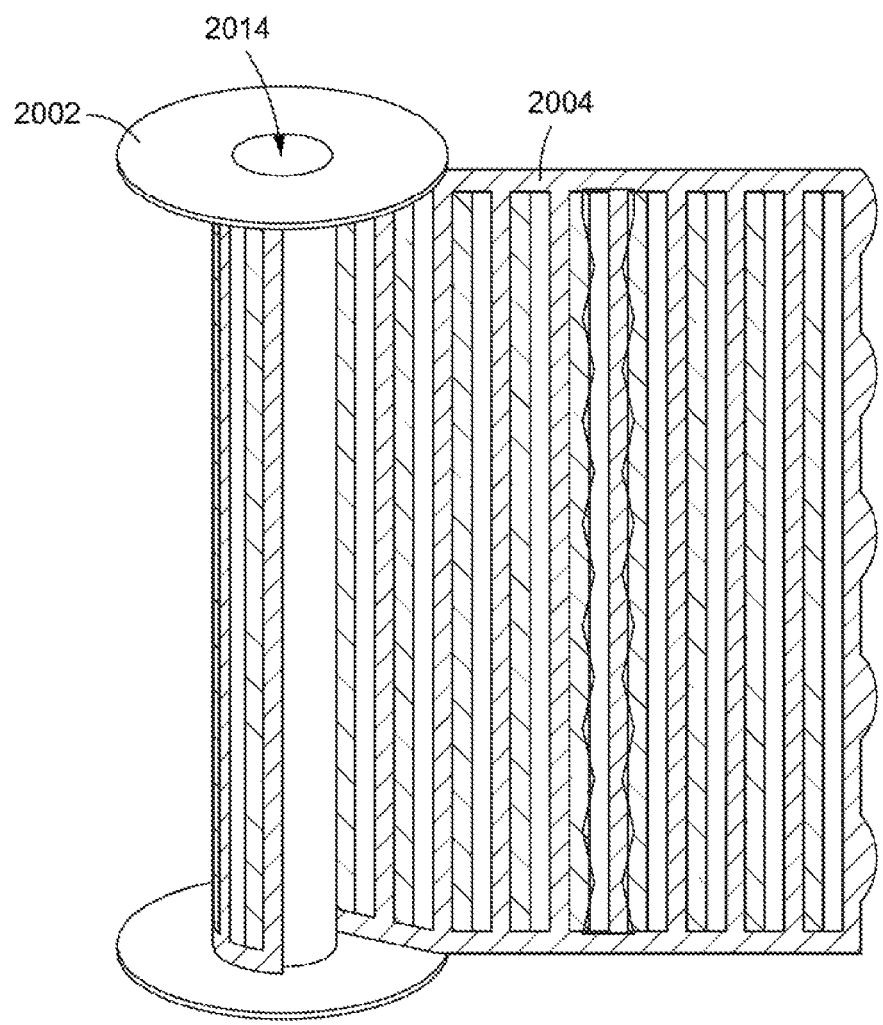
FIGS. 20A and 20B are schematic illustrations of a rollable screen comprising a plurality of pieces coupled together to form the rollable screen.
Figure 20B:
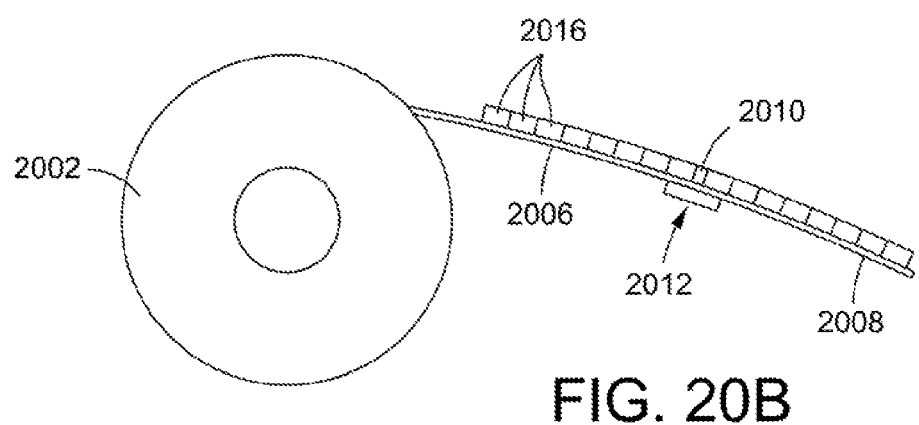

FIGS. 20A and 20B are schematic illustrations of a rollable screen comprising a plurality of pieces coupled together to form the rollable screen. A roller 2002 is present upon which the screen 2004 is wound or unwound. The screen 2004 comprises a plurality of pieces 2006, 2008 that are coupled together at a seam 2010 by a coupling mechanism 2012, which may comprise tape. The seam 2010 and hence, the coupling mechanism 2012 is substantially parallel to the longitudinal axis 2014 of the roller 2002 such that the screen 2004 is rolled parallel to the longitudinal direction of the phosphor stripes 2016. The rolling of the screen along an axis that is parallel to the longitudinal direction of the phosphor stripes 2016 and the seam 2010 is easier to manufacture that perpendicular and results in structure that is more mechanically sound. In one embodiment, the segments that may extend from any one layer as a phosphor stripe may extend from a layer or a stripe divider may extend from a layer, the rolling of the layer is such that the extended segment extends out from the layer in rolling, so the extended segment extends out from an adhered layer when in the rolled state.

The material of the edge of the screen 2004, which is a non-imaging portion, is selected such that the material allows for the screen 2004 to be under mostly uniform tension. The material of the non-imaging portion may either be merely an extension of the material of the imaging portion, a thicker portion of the material of the imaging portion or may have some additional material that helps distribute the tension pressure (e.g., a bar, another pliable material, etc.). The periphery of the screen 2004 is mechanically strong such that the screen is under tension for framing. It is to be noted that the phosphors that may be used include printed ink phosphors, which is applied to a layer in one of various printing manners, such as disclosed in U.S. Pat. No. 7,474,286, which is incorporated herein by reference in its entirety.

During rolling, the screen 2004 will be under stress, more specifically, shear stress to pull apart the layers of the screen and delaminate the screen. The rollability of the screen 2004 is predicated upon the radius of the roller 2002 being sufficiently large such that the screen 2004 does not exceed the shear stress point for the screen 2004. In other words, the screen 2004 is rolled short of the point of delamination due to shear stress such that the screen 2004 remains within the shear stress tolerance. As such, the radius of curvature for the roller 2002, which defines the radius of curvature for the screen 2004 when rolled, is minimized so that the likelihood of delamination of the layers of the screen, which may occur when the screen is rolled on the roller 2002, is minimized.

As used herein, it is to be understood that the plurality of layers of the screen and the phosphors are layer planes that are layered upon one another. Furthermore, the plurality of screens that collectively form a single, large screen may be said to be adjacent one another or, in some cases, abutting one another. The multiple screens and the phosphors may be considered to be abutting one another while the multiple layers may be considered to be adjacent to one another. In other words, the edges of the phosphors or screens abut the nearest phosphor or screen while the layers stacked one over the other are adjacent to one another.

While the foregoing is directed to embodiments of the present disclosure, other and further embodiments of the disclosure may be devised without departing from the basic scope thereof, and the scope thereof is determined by the claims that follow.

I claim:

1. An apparatus, comprising:
   a composite phosphor-filter layer comprising:
      stripes of phosphor where a plurality of parallel fluorescent stripes are formed, wherein adjacent fluorescent stripes are made of different fluorescent materials that absorb light at an excitation wavelength to emit light of different colors, respectively, where the fluorescent stripes include a low-index refraction that is disposed in the region between any separation between phosphor regions;
      a first layer sheet, where the first layer sheet includes a coextruded filter layer, where the coextruded filter layer reflects white light and passes an excitation light, where the coextruded filter layer side which has the excitation light passed through is affixed to the stripes of phosphor;
      a second layer sheet, where the second layer sheet includes a coextruded filter layer, where the coextruded filter layer reflects white light and passes an excitation light, where the coextruded filter layer side which has the excitation light passed through is affixed to the stripes of phosphor;
      the first layer sheet and the second layer sheet are disposed next to one another such that the sheets abut one another to collectively form a single composite phosphor-filter layer, where the spacing between adjacent phosphor stripes is of a particular pitch, where the first layer sheet and the second layer sheet are coupled together by a coupling mechanism; the composite phosphor-filter layer is rolled.

2. The apparatus of claim 1, further comprising a third layer sheet where the phosphor stripes are between the first layer sheet and the third layer sheet, where there is a low index gap between the phosphor stripes and the third layer sheet.

3. The apparatus of claim 2, wherein the third layer sheet is the coupling mechanism.

4. The apparatus of claim 2, wherein the composite phosphor-filter layer has a roll radius that is governed by: a total film thickness, an area of glue between the layers, a shear strength of the glues, and phosphor properties.

5. The apparatus of claim 2, wherein the third layer sheet overlays the abutment of the first and second layer sheets.

6. The apparatus of claim 2, wherein the third layer sheet edge is in line with the first layer sheet edge.

7. The apparatus of claim 1, wherein the coupling mechanism is a tape, wherein the tape is attached at the seam between the first and second layer sheets on the non-phosphor side of the first and second layer sheets.

8. The apparatus of claim 1, wherein the layer sheet is of an all-polymer construction.

9. The apparatus of claim 1, wherein the first and second layer sheets further comprise reflective servo reference marks.

10. An apparatus, comprising:
    one or more light engines, wherein each light engine includes one or more light sources for emitting a light towards a screen; and
    a rollable screen, wherein the rollable screen includes:
       a plurality of layer sheets disposed laterally adjacent each other; and
       a composite filter layer coupled to the plurality of sheets, wherein the composite filter layer includes:
          phosphor regions, wherein each phosphor region includes stripes of phosphor, wherein the stripes of phosphor are a plurality of parallel fluorescent stripes, wherein adjacent fluorescent stripes are made of different fluorescent materials that absorb light at an excitation wavelength to emit light of different colors, respectively; and
          a low-index refraction material that is disposed in the region between any separation between phosphor regions.

11. The apparatus of claim 10, further comprising reflective servo reference marks disposed on the plurality of sheets.

12. The apparatus of claim 11, wherein the screen has a rolling radius that is between about 14 inches and about 40 inches.

13. The apparatus of claim 12, wherein the plurality of layer sheets comprises at least 4 layer sheets.

14. An apparatus, comprising:
    a rollable screen, wherein the rollable screen includes:
       a first layer sheet having a first composite filter layer disposed thereon, wherein the first composite filter layer includes a plurality of first phosphor regions with a first low-index refraction material disposed in the region between any separation between first phosphor regions; and
       a second layer sheet having a second composite filter layer disposed thereon, wherein the second composite filter layer includes a plurality of second phosphor regions with a second low-index refraction material disposed in the region between any separation between second phosphor regions, wherein the first layer sheet and the second layer sheet are disposed adjacent one another to collectively form a master layer sheet, and wherein the first composite filter layer and the second composite filter layer are disposed adjacent one another to collectively form a master composite filter layer.

15. The apparatus of claim 14, further comprising reflective servo reference marks disposed on the plurality of sheets.

16. The apparatus of claim 15, wherein the screen has a rolling radius that is between about 14 inches and about 40 inches.

17. The apparatus of claim 16, wherein the plurality of layer sheets comprises at least 4 layer sheets.

\* \* \* \* \*

UNITED STATES PATENT AND TRADEMARK OFFICE
CERTIFICATE OF CORRECTION

| | |
|---|---|
| PATENT NO. | : 9,291,887 B2 |
| APPLICATION NO. | : 14/640460 |
| DATED | : March 22, 2016 |
| INVENTOR(S) | : Roger A. Hajjar |

Page 1 of 1

It is certified that error appears in the above-identified patent and that said Letters Patent is hereby corrected as shown below:

Specification

In the Detailed Description:

Column 15, Line 28, please delete "(TAO)" and insert --(TAC)-- therefor.

Signed and Sealed this
Seventeenth Day of May, 2016

Michelle K. Lee
*Director of the United States Patent and Trademark Office*